(12) United States Patent
Yamada et al.

(10) Patent No.: US 11,787,931 B2
(45) Date of Patent: Oct. 17, 2023

(54) PHOTOCURABLE RESIN COMPOSITION, SEALING MATERIAL FOR FUEL CELL, CURED PRODUCT THEREOF, FUEL CELL, AND SEALING METHOD

(71) Applicant: THREEBOND CO., LTD., Tokyo (JP)

(72) Inventors: Koji Yamada, Tokyo (JP); Akihiro Koyama, Tokyo (JP); Tetsunori Soga, Tokyo (JP)

(73) Assignee: THREEBOND CO., LTD., Tokyo (JP)

( * ) Notice: Subject to any disclaimer, the term of this patent is extended or adjusted under 35 U.S.C. 154(b) by 258 days.

(21) Appl. No.: 17/295,428

(22) PCT Filed: Oct. 17, 2019

(86) PCT No.: PCT/JP2019/040981
§ 371 (c)(1),
(2) Date: May 19, 2021

(87) PCT Pub. No.: WO2020/105333
PCT Pub. Date: May 28, 2020

(65) Prior Publication Data
US 2021/0403699 A1    Dec. 30, 2021

(30) Foreign Application Priority Data
Nov. 21, 2018   (JP) .................. 2018-217819

(51) Int. Cl.
*C08L 51/06* (2006.01)
*C09K 3/10* (2006.01)
(Continued)

(52) U.S. Cl.
CPC ............ *C08L 51/06* (2013.01); *C09K 3/10* (2013.01); *H01M 8/0284* (2013.01);
(Continued)

(58) Field of Classification Search
None
See application file for complete search history.

(56) References Cited

U.S. PATENT DOCUMENTS

| 5,171,760 A | 12/1992 | Kaszas et al. |
| 10,240,026 B2 * | 3/2019 | Takeo ................ C09D 7/41 |

(Continued)

FOREIGN PATENT DOCUMENTS

| EP | 2762506 A1 | 8/2014 |
| JP | H02-88614 A | 3/1990 |

(Continued)

OTHER PUBLICATIONS

Extended European Search Report dated Oct. 21, 2022, for the corresponding European Application No. 19887032.1.
(Continued)

*Primary Examiner* — Alix E Eggerding
(74) *Attorney, Agent, or Firm* — LUCAS & MERCANTI, LLP

(57) ABSTRACT

An object of the present invention is to provide a photocurable resin composition that can cope with application by screen printing and can be photocured in a short time. The present invention relates to a photocurable resin composition containing the following components (A) to (D):
  component (A): a polymer having one or more (meth) acryloyl groups and a polyisobutylene skeleton containing $-[CH_2C(CH_3)_2]-$ unit,
  component (B): a monofunctional monomer containing the following component (b1) and component (b2),
  component (b1): a monofunctional monomer having a (meth)acryloyl group and a hydroxy group,
  (Continued)

component (b2): a monofunctional monomer having a (meth)acryloyl group and no hydroxy group,
component (C): a radical polymerization initiator, and
component (D): organic resin particles.

17 Claims, 1 Drawing Sheet

(51) Int. Cl.
*H01M 8/0284* (2016.01)
*H01M 8/0286* (2016.01)
*H01M 8/1004* (2016.01)
*H01M 8/10* (2016.01)

(52) U.S. Cl.
CPC ... *H01M 8/0286* (2013.01); *C09K 2003/1062* (2013.01); *H01M 8/1004* (2013.01); *H01M 2008/1095* (2013.01)

(56) References Cited

U.S. PATENT DOCUMENTS

| 11,414,512 | B2* | 8/2022 | Soga | C09D 4/06 |
| 2005/0043480 | A1 | 2/2005 | Osawa | |
| 2006/0052546 | A1 | 3/2006 | Morikawa et al. | |
| 2013/0287980 | A1* | 10/2013 | Burdzy | C09J 123/22 |
| | | | | 156/327 |
| 2014/0287340 | A1 | 9/2014 | Yamamoto et al. | |
| 2020/0048389 | A1 | 2/2020 | Soga | |
| 2020/0350602 | A1* | 11/2020 | Soga | C09J 5/00 |
| 2022/0069320 | A1* | 3/2022 | Koyama | C09J 4/06 |

FOREIGN PATENT DOCUMENTS

| JP | 2004-075824 A | 3/2004 |
| JP | 2004-111146 A | 4/2004 |
| JP | 2004327204 A | 11/2004 |
| JP | 2007-100099 A | 4/2007 |
| JP | 2008-041448 A | 2/2008 |
| JP | 2009-117314 A | 5/2009 |
| JP | 2013-216782 A | 10/2013 |
| JP | 2013-229323 A | 11/2013 |
| WO | 2018/190415 A1 | 10/2018 |

OTHER PUBLICATIONS

PCT, International Search Report for the corresponding patent application No. PCT/JP2019/040981, dated Dec. 10, 2019, with English translation.
PCT, Written Opinion of the International Searching Authority for the corresponding patent application No. PCT/JP2019/040981, dated Dec. 10, 2019 (English translation not available).
Office Action for the corresponding Chinese patent application No. 201980070801.6, dated Apr. 15, 2023, with English translation (12 pages).
Office Action dated Jun. 6, 2023, for the corresponding Japanese patent application No. 2020-558167, with English translation.

* cited by examiner

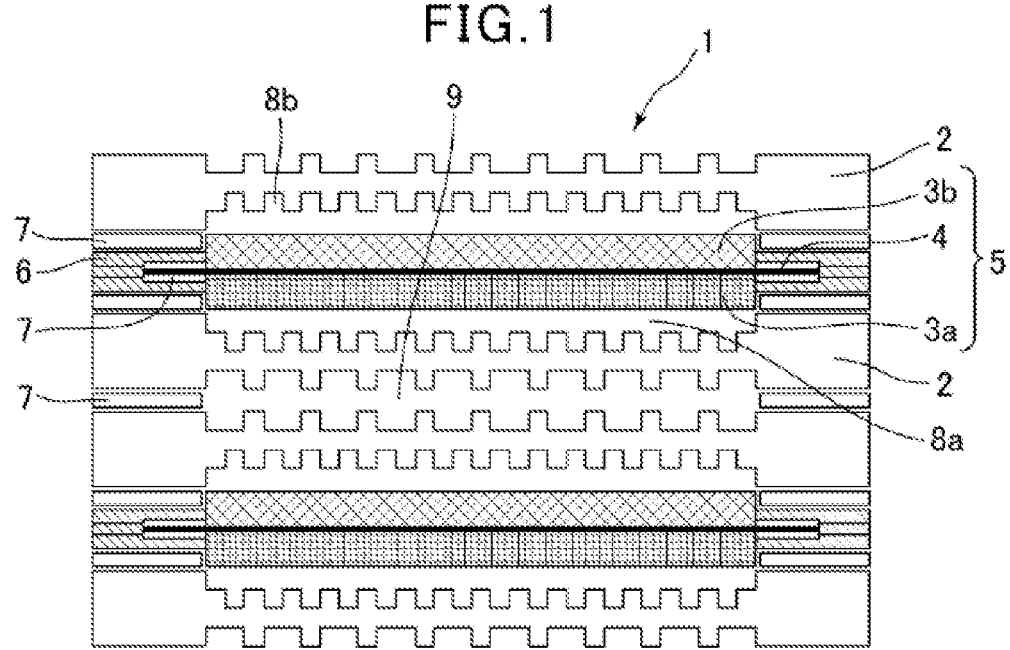
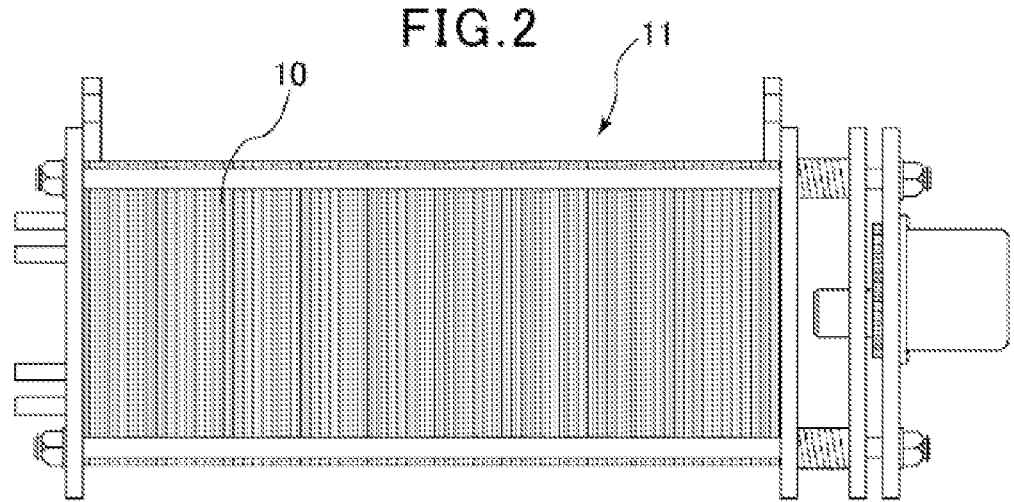

PHOTOCURABLE RESIN COMPOSITION, SEALING MATERIAL FOR FUEL CELL, CURED PRODUCT THEREOF, FUEL CELL, AND SEALING METHOD

CROSS REFERENCE TO RELATED APPLICATION

This Application is a 371 of PCT/JP2019/040981 filed on Oct. 17, 2019 which, in turn, claimed the priority of Japanese Patent Application No. 2018-217819 filed on Nov. 21, 2018, both applications are incorporated herein by reference.

TECHNICAL FIELD

The present invention relates to a photocurable resin composition, a sealing material for a fuel cell, a cured product thereof, a fuel cell, and a sealing method.

BACKGROUND ART

In recent years, fuel cells have drawn attention as new energy systems for automobiles and households. A fuel cell is a power generator that extracts electricity by chemically reacting hydrogen and oxygen. In addition, the fuel cell is a clean power generator of the next generation because the fuel cell achieves a high energy efficiency in power generation, and forms water from the reaction of the hydrogen and the oxygen. There are four types of fuel cells, i.e., a solid polymer fuel cell, a phosphoric acid fuel cell, a molten carbonate fuel cell, and a solid oxide fuel cell. Among them, the solid polymer fuel cell achieves a high power generation efficiency even though its operation temperature is relatively low temperature (around 80° C.), and therefore is expected for usages such as motive power sources for automobiles, power generators for households, small power sources for electronic equipment such as mobile phones, and power sources for emergency.

A general cell of a solid polymer fuel cell has a structure including: an electrolyte membrane electrode assembly (MEA) structured such that a polymer electrolyte membrane is nipped between an air electrode (cathode) and a fuel electrode (anode); a frame that supports the MEA; and a separator by which a gas flow path is formed.

In order to activate the solid polymer fuel cell, it is necessary to supply a fuel gas containing hydrogen to an anode electrode and supply an oxidation gas containing oxygen to a cathode electrode in such a separated manner that these gases can be isolated from each other. There is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and so on. Specifically, the sealing agent is used between adjacent separators, between a separator and a frame, between a frame and an electrolyte membrane or MEA, and so on.

As to sealing agents for use in solid polymer fuel cells, studies have been made on: a thermosetting resin composition which uses a polyisobutylene polymer and causes a hydrosilylation reaction (see JP-A-2004-111146); a thermosetting resin composition which uses a fluoropolyether compound and causes a hydrosilylation reaction (see JP-A-2004-075824 corresponding to US-A-2005/043480); a thermosetting resin composition which uses a fluoropolymer and causes a hydrosilylation reaction (see JP-A-2007-100099 corresponding to US-A-2006/052546); and a thermosetting resin composition which uses an ethylene-propylene-diene rubber (see JP-A-2013-229323 corresponding to US-A-2014/287340) as these compositions are rubber elastic bodies being excellent in gas barrier properties, low moisture permeability, heat resistance, acid resistance, and flexibility. However, these thermosetting resin compositions require a heating process for curing, and therefore have problems in that a long process time is required.

In this regard, attention is being paid to photocurable resin compositions that can shorten a tact time of a curing step. JP-A-H2-88614 (corresponding to U.S. Pat. No. 5,171,760) discloses a polymer composition containing a telechelic polyisobutylene polymer having two or three terminal acrylate groups and a reactive diluent.

SUMMARY OF INVENTION

In recent years, manufacturing sites have been required to further shorten the tact time in the process of applying/curing the sealing agent. Specifically, from the viewpoint of productivity, it is required to cope with screen printing (see JP-A-2009-117314) and to be photocurable in a short time (see JP-A-2008-041448). However, since the polymer composition of JP-A-H2-88614 (corresponding to U.S. Pat. No. 5,171,760) uses a high-molecular-weight polymer in order to improve a sealing property, the problem is that it is difficult to defoam air bubbles generated during screen printing and the polymer composition is not suitable for screen printing. Another problem is that it is difficult to improve photocurability due to the molecular weight and skeleton of the polymer used in the polymer composition of JP-A-H2-88614 (corresponding to U.S. Pat. No. 5,171,760).

Thus, the present invention has been made in view of the foregoing circumstances, and has an object to provide a photocurable resin composition that can cope with application by screen printing and can be photocured in a short time.

One embodiment of the present invention is associated with the following [1]:

[1] a photocurable resin composition containing the following components (A) to (D):

component (A): a polymer having one or more (meth)acryloyl groups and a polyisobutylene skeleton containing —[$CH_2C(CH_3)_2$]— unit, component (B): a monofunctional monomer containing the following component (b1) and component (b2), (b1): a monofunctional monomer having a (meth)acryloyl group and a hydroxy group, (b2): a monofunctional monomer having a (meth)acryloyl group and no hydroxy group, component (C): a radical polymerization initiator, and component (D): organic resin particles.

The present invention includes the following embodiments according to [2] to [17] as non-limiting examples of preferred embodiments:

[2] The photocurable resin composition according to [1], wherein the component (A) is a polymer having a polyisobutylene skeleton represented by a general formula (1) described later;

[3] The photocurable resin composition according to [1] or [2], containing 0.1 to 15 parts by mass of the component (b1) and 5 to 500 parts by mass of the component (b2), with respect to 100 parts by mass of the component (A);

[4] The photocurable resin composition according to any one of [1] to [3], wherein an average particle size of the component (D) is 0.05 to 50 μm;

[5] The photocurable resin composition according to any one of [1] to [4], wherein the component (D) is at least one selected from the group consisting of (meth)acrylic resin particles, polystyrene particles, styrene/olefin copolymer particles, polyethylene particles, and polypropylene particles;

[6] The photocurable resin composition according to any one of [1] to [5], wherein the component (b1) is at least one selected from the group consisting of 4-hydroxybutyl (meth)acrylate, 3-hydroxypropyl (meth)acrylate, 2-hydroxypropyl (meth)acrylate, 2-hydroxyethyl (meth)acrylate, 2-hydroxybutyl (meta)acrylate, 2-hydroxy-3-phenoxypropyl acrylate, 2-acryloyloxyethyl-2-hydroxyethyl-phthalic acid, and 2-(meth)acryloyloxyethyl acid phosphate;

[7] The photocurable resin composition according to any one of [1] to [6], wherein the component (b2) is a (meth)acrylate monomer having an alkyl group having 5 to 30 carbon atoms or an alicyclic hydrocarbon group having 5 to 30 carbon atoms and having no hydroxy group;

[8] A curable sealing agent for a fuel cell, including the photocurable resin composition according to any one of [1] to [7];

[9] The curable sealing agent for a fuel cell according to [8], which is a sealing agent for a periphery of any member selected from the group consisting of separators, frames, electrolyte membranes, fuel electrodes, air electrodes, and electrolyte membrane electrode assemblies, which are members in a fuel cell;

[10] The curable sealing agent for a fuel cell according to [8], which is a sealing agent between adjacent separators in a fuel cell or a sealing agent between a frame and an electrolyte membrane or an electrolyte membrane electrode assembly in a fuel cell;

[11] The curable sealing agent for a fuel cell according to any one of [8] to [10], which is a sealing agent for a solid polymer fuel cell;

[12] A cured product obtained by applying light to the photocurable resin composition according to any one of [1] to [7] or the curable sealing agent for a fuel cell according to any one of [8] to [11].

[13] A fuel cell comprising at least one seal selected from the group consisting of a seal between adjacent separators in the fuel cell and a seal between a frame and an electrolyte membrane or an electrolyte membrane electrode assembly in the fuel cell, wherein at least one of the seals is the cured product according to [12];

[14] The fuel cell according to [13], which is a solid polymer fuel cell;

[15] A method for sealing at least part between at least two flanges of a seal target component having the at least two flanges, wherein at least one of the flanges is light-transmissive for active energy rays, and the method includes:

a step of applying the photocurable resin composition according to any one of [1] to [7] to a surface of at least one of the flanges;

a step of sticking the one flange with the photocurable resin composition applied thereto onto the other flange with the photocurable resin composition interposed in between; and a step of sealing the at least part between the at least two flanges by curing the photocurable resin composition by irradiation with the active energy ray through the light-transmissive flange;

[16] A method for sealing at least part between at least two flanges of a seal target component having the at least two flanges, including:

a step of applying the photocurable resin composition according to any one of [1] to [7] to at least one of the flanges;

a step of irradiating the applied photocurable resin composition with an active energy ray to cure the photocurable resin composition to form a gasket composed of a cured product of the photocurable resin composition; and a step of placing the other flange on the gasket, pressure bonding the one flange with the photocurable resin composition applied thereto and the other flange together with the gasket interposed in between, and sealing the at least part between the at least two flanges;

[17] A method for sealing at least part between at least two flanges of a seal target component having the at least two flanges, including:

a step of placing a gasket formation mold on at least one of the flanges;

a step of injecting the photocurable resin composition according to any one of [1] to [7] into at least part of a cavity between the gasket formation mold and the flange on which the mold is placed;

a step of irradiating the photocurable resin composition with an active energy ray to cure the photocurable resin composition, and thus to form a gasket composed of a cured product of the photocurable resin composition;

a step of detaching the mold from the one flange; and a step of placing the other flange on the gasket, pressure bonding the one flange and the other flange together with the gasket interposed in between, and sealing the at least part between the at least two flanges.

BRIEF DESCRIPTION OF DRAWINGS

FIG. 1 is a schematic cross-sectional view of a single cell of an example of a fuel cell. In FIG. 1, reference numeral 1 indicates a cell of a solid polymer fuel cell, reference numeral 2 indicates a separator, reference numeral 3a indicates an air electrode (cathode), reference numeral 3b indicates a fuel electrode (anode), reference numeral 4 indicates a polymer electrolyte membrane, reference numeral 5 indicates an electrolyte membrane electrode assembly (MEA), reference numeral 6 indicates a frame, reference numeral 7 indicates an adhesive or sealing agent, reference numeral 8a indicates an oxidation gas flow path, reference numeral 8b indicates a fuel gas flow path, and reference numeral 9 indicates a cooling water flow path.

FIG. 2 is a schematic diagram illustrating the entirety of an example of the fuel cell. In FIG. 2, reference numeral 10 indicates a cell stack and reference numeral 11 indicates a solid polymer fuel cell.

DESCRIPTION OF EMBODIMENTS

Hereinafter, embodiments of the present invention will be described. The present invention is not limited to only the following embodiments. In the present specification, in the expression "to" or "from" indicating a range from an upper limit value to a lower limit value, the upper and lower limit values themselves are included in the range. That is, "X to Y" showing a range includes X and Y and means "not less than X and not more than Y". In addition, unless otherwise specified, operations and measurements of physical properties and the like are carried out at room temperature (20° C. to 25° C.)/relative humidity 40% RH to 50% RH.

In the present specification, an acryloyl group and a methacryloyl group are collectively referred to as a (meth)acryloyl group. A compound having a (meth)acryloyl group is also referred to as a (meth)acrylate. Similarly, for example, compounds containing the (meth) of (meth)acrylic acid etc. collectively refer to compounds that have and do not have "meth" in the names.

One aspect of the present invention relates to a photocurable resin composition containing the following components (A) to (D). One aspect of the present invention provides a photocurable resin composition that can cope with application by screen printing and can be photocured in a short time:

component (A): a polymer having one or more (meth) acryloyl groups and a polyisobutylene skeleton containing —[CH$_2$C(CH$_3$)$_2$]— unit, component (B): a monofunctional monomer containing the following component (b1) and component (b2), (b1): a monofunctional monomer having a (meth)acryloyl group and a hydroxy group, (b2): a monofunctional monomer having a (meth)acryloyl group and no hydroxy group, component (C): a radical polymerization initiator, and component (D): organic resin particles.

Details of the invention will be described below.

<Component (A)>

The component (A) contained in the photocurable resin composition according to one embodiment of the present invention is a polymer having one or more (meth)acryloyl groups (CH$_2$=CH—C(=O)— or CH$_2$=C(CH$_3$)—C(=O)—) and a polyisobutylene skeleton containing —[CH$_2$C(CH$_3$)$_2$] unit. The component (A) is not particularly limited as long as it is a polymer having one or more (meth)acryloyl groups and a polyisobutylene skeleton containing —[CH$_2$C(CH$_3$)$_2$]— unit. In the present specification, "a polyisobutylene skeleton containing —[CH$_2$C(CH$_3$)$_2$]— unit" is also simply referred to as "polyisobutylene skeleton".

The component (A) has a polyisobutylene skeleton containing —[CH$_2$C(CH$_3$)$_2$]— unit. The polyisobutylene skeleton included in the component (A) only needs to have —[CH$_2$C(CH$_3$)$_2$]— unit, and may further include, for example, other constituent units such as "other constituent units than the —[CH$_2$C(CH$_3$)$_2$]— unit". Here, from the viewpoint of obtaining an excellent sealing property and a photocurable resin composition that can be photocured in a short time, the other constituent unit included in the polyisobutylene skeleton is preferably a divalent non-aromatic hydrocarbon group, and more preferably a divalent aliphatic hydrocarbon group. Here, examples of the divalent aliphatic hydrocarbon group include a linear or branched alkylene group having 1 to 12 carbon atoms (for example, methylene group, ethylene group, n-propylene group, isopropylene group, n-butylene group, isobutylene group, sec-butylene group, tert-butylene group, n-pentylene group, isopentylene group, sec-pentylene group, tert-pentylene group, n-hexylene group, isohexylene group, sec-hexylene group, tert-hexylene group, heptylene group, octylene group, 2-ethyl-hexylene group, nonylene group, decylene group, undecylene group, dodecylene group) and the like. Among these, for example, a linear or branched alkylene group having 1 to 6 carbon atoms, such as methylene group, ethylene group, trimethylene group, tetramethylene group, propylene group (—CH(CH$_3$)CH$_2$—), isopropylene group (—C(CH$_3$)$_2$—) or the like, is preferable.

The component (A) suitably contains —[CH$_2$C(CH$_3$)$_2$]— unit in an amount of, for example, 70% by mass or more, preferably 75% by mass or more, more preferably 80% by mass or more with respect to a total amount of constituent unit (that is, component (A)). Furthermore, with respect to the total amount of constituent unit (that is, component (A)), the component (A) suitably contains —[CH$_2$C(CH$_3$)$_2$]— unit in an amount of, for example, less than 100% by mass, in another embodiment, the component (A) suitably contains the —[CH$_2$C(CH$_3$)$_2$]— unit in an amount of 95% by mass or less, and in still another embodiment, the component (A) suitably contains the —[CH$_2$C(CH$_3$)$_2$]— unit in an amount of 90% by mass or less. Within this range, a more excellent sealing property and a photocurable resin composition that can be photocured in a shorter time can be obtained.

The polyisobutylene skeleton preferably contains —[CH$_2$C(CH$_3$)$_2$]— unit in an amount of more than 50% by mass, more preferably 90% by mass or more, still more preferably 95% by mass or more, based on the polyisobutylene skeleton. Furthermore, the polyisobutylene skeleton contains —[CH$_2$C(CH$_3$)$_2$]— unit in an amount of 100% by mass or less, preferably less than 100% by mass, more preferably less than 99.5% by mass, based on the polyisobutylene skeleton. Within this range, a more excellent sealing property and a photocurable resin composition that can be photocured in a shorter time can be obtained.

The component (A) has one or more (meth)acryloyl groups. The number of (meth)acryloyl groups included in the component (A) is not particularly limited as long as it is 1 or more, and the number is preferably 1 to 12, more preferably 2 to 8, still more preferably 2 to 4, and particularly preferably 2. Within this range, a more excellent sealing property and a photocurable resin composition that can be photocured in a shorter time can be obtained. The (meth)acryloyl group may be present at either the side chain and/or the end of the molecule, but is preferably present at the end of the molecule from the viewpoint of rubber elasticity.

In the present specification, the polymer is not theoretically restricted but can be defined as, for example, a compound having a structure in which repeating units of a monomer in the molecule are contained, such as a main chain, and containing 100 or more of the repeating units.

The number of repetitions of —[CH$_2$C(CH$_3$)$_2$]— units contained in the component (A) is preferably 100 or more, more preferably 150 or more, and still more preferably 180 or more. The number of repetitions of —[CH$_2$C(CH$_3$)$_2$]— units contained in the component (A) is preferably 500 or less, more preferably 300 or less, and still more preferably 200 or less. Within this range, a more excellent sealing property and a photocurable resin composition that can be photocured in a shorter time can be obtained. Here, when there are two or more —[CH$_2$C(CH$_3$)$_2$]— units present at positions away from each other in the molecule, the number of repetitions of —[CH$_2$C(CH$_3$)$_2$]— units is a total of the —[CH$_2$C(CH$_3$)$_2$]— units.

The component (A) is preferably a polymer having a polyisobutylene skeleton represented by the following general formula (1) from the viewpoint of obtaining an excellent sealing property and a photocurable resin composition that can be photocured in a short time. Specific examples of the component (A) include polyisobutylene having a (meth) acryloyloxyalkoxyphenyl group. Although the main skeleton of the component (A) is a polyisobutylene skeleton, as for monomers constituting this polyisobutylene skeleton, it is possible to mainly use isobutylene and additionally use the other monomer(s) and to copolymerize them as long as the effects of the present invention are not impaired. The other monomer is preferably a non-aromatic monomer.

[Chemical 1]

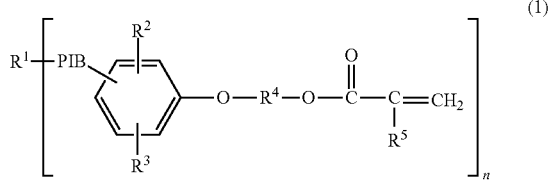

In the above general formula (1), $R^1$ represents a monovalent or polyvalent aromatic hydrocarbon group or a monovalent or polyvalent aliphatic hydrocarbon group. Here, the aromatic hydrocarbon group is not particularly limited, and examples thereof include groups derived from benzene, pentalene, indene, naphthalene, anthracene, azulene, heptalene, acenaphthalene, phenalene, fluorene, anthraquinone, phenanthrene, biphenyl, terphenyl, quarterphenyl, quinquephenyl, sexiphenyl, triphenylene, pyrene, chrysene, picene, perylene, pentaphene, pentacene, tetraphene, hexaphene, hexacene, rubicene, trinaphthylene, heptaphene, pyranthrene, and the like. Among these, from the viewpoint of obtaining an excellent sealing property and a photocurable resin composition that can be photocured in a short time, groups derived from benzene, naphthalene, anthracene, and biphenyl are preferable, and groups derived from benzene are more preferable. The aliphatic hydrocarbon group is not particularly limited, and examples thereof include a linear or branched alkyl group having 1 to 12 carbon atoms (for example, methyl group, ethyl group, n-propyl group, isopropyl group, n-butyl group, isobutyl group, sec-butyl group, tert-butyl group, n-pentyl group, isopentyl group, sec-pentyl group, tert-pentyl group, n-hexyl group, isohexyl group, sec-hexyl group, tert-hexyl group, heptyl group, octyl group, 2-ethylhexyl group, nonyl group, decyl group, undecyl group, dodecyl group), a linear or branched alkylene group having 1 to 12 carbon atoms (for example, methylene group, ethylene group, n-propylene group, isopropylene group, n-butylene group, isobutylene group, sec-butylene group, tert-butylene group, n-pentylene group, isopentylene group, sec-pentylene group, tert-pentylene group, n-hexylene group, isohexylene group, sec-hexylene group, tert-hexylene group, heptylene group, octylene group, 2-ethylhexylene group, nonylene group, decylene group, undecylene group, dodecylene group), and the like. $R^1$ is a monovalent or polyvalent group, and when aliphatic hydrocarbon is a trivalent or higher valent group, for example, a group obtained by removing a hydrogen atom from the above-mentioned aliphatic hydrocarbon group can be mentioned. Here, the valence of $R^1$ is not particularly limited, and from the viewpoint of obtaining an excellent sealing property and a photocurable resin composition that can be photocured in a short time, the valence of $R^1$ is preferably 1 to 12, more preferably 2 to 8, still more preferably 2 to 4, and particularly preferably 2. That is, $R^1$ is preferably a polyvalent aromatic hydrocarbon group, more preferably a divalent to tetravalent benzene-derived group, particularly still more preferably a divalent phenylene group (o-, m-, p-phenylene group), and particularly preferably a divalent p-phenylene group.

In the above general formula (1), PIB represents a polyisobutylene skeleton containing the —[CH$_2$C(CH$_3$)$_2$]— unit (or consisting of —[CH$_2$C(CH$_3$)$_2$]— unit). In the former case (that is, PIB contains other units in addition to —[CH$_2$C(CH$_3$)$_2$]— unit), the other units are not particularly limited, and examples thereof include a linear or branched alkylene group having 1 to 6 carbon atoms such as methylene group, ethylene group, trimethylene group, tetramethylene group, propylene group (—CH(CH$_3$)CH$_2$—) and isopropylene group (—C(CH$_3$)$_2$—). Among these, from the viewpoint of obtaining an excellent sealing property and a photocurable resin composition that can be photocured in a short time, PIB preferably consists of —[CH$_2$C(CH$_3$)$_2$]— unit or consists of a linear or branched alkylene group having 2 to 6 carbon atoms and —[CH$_2$C(CH$_3$)$_2$]— unit, more preferably consists of a branched alkylene group having 3 to 5 carbon atoms and —[CH$_2$C(CH$_3$)$_2$]— unit, and particularly preferably consists of an isopropylene group (—C(CH$_3$)$_2$—) and —[CH$_2$C(CH$_3$)$_2$]— unit (for example, [—C(CH$_3$)$_2$—[CH$_2$C(CH$_3$) 2]—] unit or [—C(CH$_3$)$_2$—[C(CH$_3$)$_2$CH$_2$]—] unit).

$R^4$ represents a divalent hydrocarbon group having 2 to 6 carbon atoms which may contain an oxygen atom. Here, the divalent hydrocarbon group having 2 to 6 carbon atoms is not particularly limited, and a group similar to the above PIB can be exemplified. Among these, from the viewpoint of obtaining an excellent sealing property and a photocurable resin composition that can be photocured in a short time, $R^4$ is preferably a divalent hydrocarbon group having 2 or 3 carbon atoms (such as ethylene group (—CH$_2$—CH$_2$—), trimethylene group (—CH$_2$—CH$_2$—CH$_2$—), propylene group (—CH(CH$_3$)CH$_2$—), isopropylene group (—C(CH$_3$)$_2$—), or the like), and more preferably an ethylene group. When $R^4$ contains an oxygen atom, the position of the oxygen atom is not particularly limited. For example, an oxygen atom is introduced at at least one end of the above alkylene group or between adjacent carbon atoms constituting the alkylene group, or one or more hydrogen atoms constituting the alkylene group are replaced with an oxygen atom.

In the above general formula (1), $R^2$ and $R^3$ each independently represent a hydrogen atom or a monovalent hydrocarbon group having 1 to 20 carbon atoms. Here, $R^2$ and $R^3$ may be the same or different. The monovalent hydrocarbon group having 1 to 20 carbon atoms is not particularly limited, and examples thereof include linear or branched alkyl groups such as methyl group, ethyl group, n-propyl group, isopropyl group, n-butyl group, isobutyl group, sec-butyl group, tert-butyl group, n-pentyl group, isopentyl, neopentyl, n-hexyl group, cyclohexyl group, n-heptyl group, n-octyl group, 2-ethylhexyl group, n-nonyl group, n-decyl group, n-undecyl group, n-dodecyl group, n-tridecyl group, n-tetradecyl group, 2-tetraoctyl group, n-pentadecyl group, n-hexadecyl group, 2-hexyldecyl group, n-heptadecyl group, 1-octylnonyl group, n-octadecyl group, n-nonadecil group, n-icosyl group, and the like; cyclic alkyl groups such as cyclohexyl group, cyclooctyl group, and the like; and the like. Among these, from the viewpoint of obtaining an excellent sealing property and a photocurable resin composition that can be photocured in a short time, $R^2$ and $R^3$ are preferably a hydrogen atom or a linear or branched alkyl group having 1 to 8 carbon atoms, more preferably a hydrogen atom or a linear or branched alkyl group having 1 to 3 carbon atoms, and particularly preferably a hydrogen atom.

In the above general formula (1), $R^5$ represents a hydrogen atom, a methyl group, and an ethyl group. Among these, from the viewpoint of obtaining an excellent sealing property and a photocurable resin composition that can be photocured in a short time, $R^5$ is preferably a hydrogen atom or a methyl group and more preferably a hydrogen atom.

In the above general formula (1), n represents an integer of 1 to 6. Among these, from the viewpoint of obtaining an excellent sealing property and a photocurable resin composition that can be photocured in a short time, n is preferably an integer of 2 to 4 and more preferably 2.

The component (A) is preferably liquid at room temperature (25° C.) because it is possible to obtain a photocurable resin composition that can cope with application by screen printing even better.

The molecular weight of the component (A) is not particularly limited, and from the viewpoint of being capable of coping with application by screen printing and obtaining an excellent sealing property, a number average molecular weight by chromatographic measurement is preferably 200 to 500,000, more preferably 1,000 to 100,000, and still more preferably 3,000 to 50,000. The number average molecular weight can be calculated by a standard polystyrene conversion method using size permeation chromatography (SEC).

A viscosity of the component (A) at 25° C. is not particularly limited, and from the viewpoint of workability and the like, the viscosity is preferably 5 Pa·s or more, more preferably 50 Pa·s or more, and still more preferably 100 Pa·s or more. Furthermore, the viscosity of the component (A) at 25° C. is not particularly limited, and from the same viewpoint, the viscosity is preferably 3000 Pa·s or less, more preferably 2500 Pa·s or less, and still more preferably 2000 Pa·s or less. A particularly preferable viscosity is 1550 Pa·s or less. Unless otherwise specified, in the measurement of the viscosity, a cone plate type viscometer is used, and the viscosity is a value obtained by measuring the viscosity at 25° C.

The component (A) may be used alone or in combination of two or more.

A method of producing the component (A) is not particularly limited, and a known method can be used. For example, there is an obtaining method including reacting a hydroxyl-terminated polyisobutylene with an acryloyl chloride or methacryloyl chloride, which are disclosed by T. P. Liao and J. P. Kennedy, Polymer Bulletin, Vol. 6, pp. 135 to 141 (1981), and Puskas et al., Polymer Bulletin, Vol. 20, pp. 253 to 260 (1988), and the like. As other methods for producing the component (A), there are: an obtaining method including reacting a hydroxyl-terminated polyisobutylene with a compound having a (meth)acryloyl group and an isocyanate group; an obtaining method including reacting a hydroxyl-terminated polyisobutylene, a compound containing an isocyanate group, and a compound containing a (meth)acryloyl group and a hydroxyl group; an obtaining method including reacting a hydroxyl-terminated polyisobutylene with an (meth)acrylic acid or a lower ester of (meth)acrylic acid, by a dehydration esterification method or an ester exchange method; and the like.

A method of producing the polymer having a polyisobutylene skeleton represented by the general formula (1) is not particularly limited, and a known method can be used. Preferable examples thereof include a method including reacting a halogen-terminated polyisobutylene disclosed in JP-A-2013-216782 with a compound represented by the following general formula (2) and containing a (meth)acryloyl group and a phenoxy group. Moreover, the halogen-terminated polyisobutylene can be obtained by a known method, and is preferably obtained by cationic polymerization, and more preferably obtained by living cationic polymerization.

[Chemical 2]

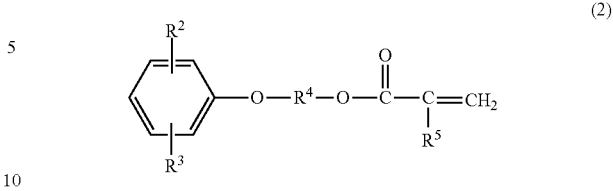

In the above general formula (2), $R^2$, $R^3$, $R^4$ and $R^5$ may be those as defined above for the formula (1). Specifically, $R^4$ represents a divalent hydrocarbon group having 2 to 6 carbon atoms and optionally containing an oxygen atom. $R^2$ and $R^3$ each independently represent a hydrogen atom or a monovalent hydrocarbon group having 1 to 20 carbon atoms. $R^5$ represents a hydrogen atom, a methyl group, and an ethyl group. Preferred embodiments of the these are the same as described with respect to the above general formula (1).

The compound represented by the above general formula (2) is not particularly limited, and examples thereof include phenoxymethyl (meth)acrylate, phenoxyethyl (meth)acrylate, phenoxypropyl (meth)acrylate, phenoxybutyl (meth) acrylate, phenoxypentyl (meth)acrylate, and the like. Among these, phenoxyethyl (meth)acrylate, phenoxypropyl (meth) acrylate, phenoxybutyl (meth)acrylate, phenoxypentyl (meth)acrylate, and the like are preferable.

<Component (B)>

The component (B) contained in the photocurable resin composition according to one embodiment of the present invention is a monofunctional monomer containing a monofunctional monomer having a (meth)acryloyl group and a hydroxy group, which is a component (b1), and a monofunctional monomer having a (meth)acryloyl group but having no hydroxy group, which is a component (b2).

By combining the component (b1), the component (b2), and other components according to one embodiment of the present invention, a photocurable resin composition that can cope with application by screen printing and can be photocured in a short time can be provided By combining (b1) and (b2), an effect of suppressing crystallization of the photocurable resin composition is further exhibited. Here, crystallization of the photocurable resin composition means crystal precipitation during storage after production of the photocurable resin composition.

In the present specification, the hydroxy group included in the component (b1) and not included in the component (b2) also includes an —OH group constituting a part of a functional group such as a carboxyl group and a phosphate group, and particularly preferred is a group existing as a group in which a hydroxyl group (—OH group) is bonded to hydrocarbon, that is, an —OH group bonded to a hydrocarbon group.

The component (b1) is not particularly limited, and examples thereof include hydroxybutyl (meth)acrylate (for example, 2-hydroxybutyl (meth)acrylate, 4-hydroxybutyl (meth)acrylate, etc.), hydroxypropyl (meth)acrylate (for example, 3-hydroxypropyl (meth)acrylate, 2-hydroxypropyl (meth)acrylate, etc.), hydroxyethyl (meth)acrylate (for example, 2-hydroxyethyl (meth)acrylate, etc.), 2-hydroxy-3-phenoxypropyl acrylate, 2-acryloyloxyethyl-2-hydroxyethyl-phthalic acid, 2-(meth) acryloyloxyethyl acid phosphate, 2-(meth)acryloyloxyethyl acid phosphate, and the like. Thus, the component (b1) is preferably at least one selected from the group consisting of 4-hydroxybutyl (meth)

acrylate, 3-hydroxypropyl (meth)acrylate, 2-hydroxypropyl (meth)acrylate, 2-hydroxyethyl (meth)acrylate, 2-hydroxybutyl (meta)acrylate, 2-hydroxy-3-phenoxypropyl acrylate, 2-acryloyloxyethyl-2-hydroxyethyl-phthalic acid, and 2-(meth)acryloyloxyethyl acid phosphate. Among these, 4-hydroxybutyl (meth)acrylate, 3-hydroxypropyl (meth) acrylate, 2-hydroxypropyl (meth)acrylate, and 2-hydroxyethyl (meth)acrylate are more preferable.

As the component (b1), a synthetic product or a commercially available product may be used. Commercially available products are not particularly limited, and examples thereof include HOA (N), HOP-A (N), HOB-A, HOB, P-1M, P-1A, G-201P, M-600A (Kyoeisha Chemical Co., Ltd), 4HBA, HPA, HEA (manufactured by Osaka Organic Chemical Industry Ltd.), and the like.

The component (b1) can be used alone or as a mixture of two or more kinds thereof.

Examples of (b2) include a (meth)acrylate monomer having an alkyl group having 5 to 30 carbon atoms and having no hydroxy group (also referred to as a hydroxyl group in the present specification), a (meth)acrylate monomer having an alicyclic hydrocarbon group having 5 to 30 carbon atoms and having no hydroxyl group, and the like. That is, examples thereof include a (meth)acrylate monomer having an alkyl group having 5 to 30 carbon atoms or an alicyclic hydrocarbon group having 5 to 30 carbon atoms and having no hydroxy group and the like. Among these, a (meth)acrylate monomer having an alicyclic hydrocarbon group having 5 to 30 carbon atoms and having no hydroxyl group is preferable. Here, the number of carbon atoms is preferably 5 or more, and more preferably 7 or more. The number of carbon atoms is preferably 30 or less, more preferably 20 or less, still more preferably 15 or less, and even more preferably 10 or less.

Examples of the (meth)acrylate monomer having an alkyl group having 5 to 30 carbon atoms (that is, (meth)acrylate monomer having an alkyl group having 5 to carbon atoms and having no hydroxyl group) is not particularly limited, and examples thereof include 2-ethylhexyl (meth)acrylate, octyl (meth)acrylate, isooctyl (meth)acrylate, decyl (meth)acrylate, dodecyl (meth)acrylate, isodecyl (meth)acrylate, lauryl (meth)acrylate, n-octadecyl (meth)acrylate, isooctadecyl (meth)acrylate, nonadecan (meth)acrylate, isostearyl (meth)acrylate, stearyl (meth)acrylate, and the like. Among these, 2-ethylhexyl (meth)acrylate, isooctyl (meth)acrylate, isodecyl (meth)acrylate, lauryl (meth)acrylate, isooctadecyl (meth)acrylate, isostearyl (meth)acrylate, stearyl (meth) acrylate, and the like are preferable.

As the (meth)acrylate monomer having an alkyl group having 5 to 30 carbon atoms and having no hydroxyl group, a synthetic product or a commercially available product may be used. Commercially available products are not particularly limited, and examples thereof include SR335, SR395, SR440, SR489D, SR313, SR324, SR493D (manufactured by Sartomer), S-1800A (manufactured by Shin-Nakamura Chemical Co., Ltd.), and the like.

Examples of the (meth)acrylate monomer having an alicyclic hydrocarbon group having 5 to 30 carbon atoms (that is, (meth)acrylate monomer having an alicyclic hydrocarbon group having 5 to 30 carbon atoms and having no hydroxyl group) is not particularly limited, and examples thereof include cyclohexyl (meth)acrylate, trimethylcyclohexyl (meth)acrylate, t-butylcyclohexyl (meth)acrylate, dicyclopentanyl (meth)acrylate, dicyclopentenyl (meth)acrylate, dicyclopentenyloxy (meth)acrylate, isobornyl (meth)acrylate, adamantyl (meth)acrylate, dicyclopentenyl di(meth) acrylate, and the like. Among these, trimethylcyclohexyl (meth)acrylate, t-butylcyclohexyl (meth)acrylate, dicyclopentanyl (meth)acrylate, dicyclopentenyl (meth)acrylate, dicyclopentenyloxy (meth)acrylate, isobornyl (meth)acrylate, and the like are preferable.

As the (meth)acrylate monomer having an alicyclic hydrocarbon group having 5 to 30 carbon atoms and having no hydroxyl group, a synthetic product or a commercially available product may be used. Commercially available products are not particularly limited, and examples thereof include SR506, SR423 (Sartomer), IBX, IBX-A (Kyoeisha Chemical Co., Ltd), FA-511AS, FA-512AS, FA-513AS, FA-512M, FA-512MT, FA-513M (Hitachi Chemical Company, Ltd.), and the like. The component (b2) can be used alone or as a mixture of two or more kinds thereof.

The molecular weights of the components (b1) and (b2) are not particularly limited, and are preferably less than 1000, more preferably 500 or less, and still more preferably 300 or less, respectively. The molecular weights of the components (b1) and (b2) can be obtained as the sum of atomic weights of atoms constituting them.

As a blending amount of the component (B), it is preferable that, with respect to 100 parts by mass of the component (A), the component (b1) be contained in an amount of 0.1 to 15 parts by mass, and the component (b2) be contained in an amount of 5 to 500 parts by mass. It is more preferable that the component (b1) be contained in an amount of 0.3 to 12 parts by mass, and the component (b2) be contained in an amount of 10 to 300 parts by mass, and it is still more preferable that the component (b1) be contained in an amount of 0.5 to 10 parts by mass, and the component (b2) be contained in an amount of 12 to 200 parts by mass. Within the above range, it is possible to provide a photocurable resin composition that can cope with application by screen printing even better and can be photocured in a short time. From the viewpoint of being capable of suppressing the crystallization of the photocurable resin composition, with respect to 100 parts by mass of the component (A), the component (b1) is in a range of preferably 0.5 to 10 parts by mass, more preferably 1.1 to 5.0 parts by mass, and still more preferably 1.3 to 4.0 parts by mass.

<Component (C)>

A photo-radical polymerization initiator that is a component (C) contained in the photocurable resin composition according to one embodiment of the present invention is not particularly limited as long as it is a compound generating radicals by irradiation with active energy rays. Here, the active energy rays mean all types of rays in a broad sense, which include radioactive rays such as α ray and β ray, electromagnetic waves such as γ ray and X ray, electron beam, ultraviolet rays with a wavelength of about 100 to 400 nm, visible rays with a wavelength of about 400 to 800 nm, and the like. Among these, ultraviolet rays are preferable.

The component (C) is not particularly limited, and examples thereof include an acetophenone-based photo-radical polymerization initiator, a benzoin-based photo-radical polymerization initiator, a benzophenone-based photo-radical polymerization initiator, a thioxanthone-based photo-radical polymerization initiator, an acylphosphine oxide-based photo-radical polymerization initiator, a titanocene-based photo-radical polymerization initiator, and the like. Among these, from the viewpoint that a photocurable resin composition that can be photocured in a short time can be obtained by irradiation with active energy rays, the acetophenone-based photo-radical polymerization initiator and the acylphosphine oxide-based photo-radical polymerization initiator are preferable, and the acylphosphine oxide-based photo-radical polymerization initiator is more preferable.

The acetophenone-based photo-radical polymerization initiator is not particularly limited, and examples thereof include diethoxyacetophenone, 2-hydroxy-2-methyl-1-phenyl-propan-1-one, benzyl dimethyl ketal, 4-(2-hydroxyethoxy)phenyl-(2-hydroxy-2-propyl)ketone, 1-hydroxy-cyclohexyl-phenyl-ketone, 2-methyl-2-morpholino(4-thiomethylphenyl)propan-1-one, 2-benzyl-2-dimethylamino-1-(4-morpholinophenyl)butanone, 2-hydroxy-2-methyl-1-[4-(1-methylvinyl)phenyl]propanone oligomer, and the like.

As the acetophenone-based photo-radical polymerization initiator, a synthetic product or a commercially available product may be used. Commercially available products are not particularly limited, and examples thereof include IRGACURE (registered trademark) 184, IRGACUR (registered trademark) 1173, IRGACURE (registered trademark) 2959, IRGACURE (registered trademark) 127 (manufactured by BASF SE), ESACURE (registered trademark) KIP-150 (manufactured by Lamberti s.p.a.), and the like.

The acylphosphine oxide-based photo-radical polymerization initiator is not particularly limited, and examples thereof include bis(2,4,6-trimethylbenzoyl)-phenyl-phosphine oxide, 2,4,6-trimethylbenzoyl-diphenyl-phosphine oxide, and the like.

As the acylphosphine oxide-based photo-radical polymerization initiator, a synthetic product or a commercially available product may be used. Commercially available products are not particularly limited, and examples thereof include Omnirad (registered trademark) TPO, Omnirad (registered trademark) 819 (manufactured by IGM Resins B.V.), IRGACURE (registered trademark) 819DW (manufactured by BASF SE), and the like.

The component (C) may be used alone or in combination of two or more.

The blending amount of the component (C) is not particularly limited, and for example, is preferably 0.1 to 20 parts by mass, more preferably 0.5 to 10 parts by mass, and still more preferably 1.1 to 5 parts by mass, with respect to 100 parts by mass of the component (A). Within the above range, it is possible to provide a photocurable resin composition that can cope with application by screen printing even better and can be photocured in a short time. From the viewpoint of being capable of suppressing the crystallization of the photocurable resin composition, with respect to 100 parts by mass of the component (A), the component (C) is in a range of preferably 0.1 to 10 parts by mass, more preferably 0.5 to 5.0 parts by mass, and still more preferably 0.7 to 4.0 parts by mass.

<Component (D)>

The component (D) contained in the photocurable resin composition according to one embodiment of the present invention is not particularly limited as long as it is an organic resin particle. By combining the component (D) with other components according to one embodiment of the present invention, an effect of defoaming air bubbles generated during screen printing of the photocurable resin composition is exhibited. It becomes possible to further suppress phase separation of the photocurable resin composition.

The component (D) is not particularly limited, and examples thereof include (meth)acrylic resin particles, polystyrene particles, styrene/olefin copolymer particles, polyethylene particles, polypropylene particles, and the like. Thus, the component (D) is, for example, preferably at least one selected from the group consisting of (meth)acrylic resin particles, polystyrene particles, styrene/olefin copolymer particles, polyethylene particles, and polypropylene particles. Among these, (meth)acrylic resin particles, polystyrene particles, styrene/olefin copolymer particles and the like are preferable, and (meth)acrylic resin particles or styrene/olefin copolymer particles are more preferable. Here, the styrene/olefin copolymer particles are obtained by copolymerizing a styrene monomer and another crosslinkable substance to form a polymer, and specific examples thereof include a copolymer of a styrene monomer and divinylbenzene, a copolymer of a styrene monomer and polybutadiene, a copolymer of a styrene monomer and isoprene, and the like.

As the component (D), a synthetic product or a commercially available product may be used. Commercially available products of (meth)acrylic resin particles are not particularly limited, and examples thereof include MBX-5, MBX-8, MBX-12, SSX-101, SSX-102, SSX-103, SSX-104, SSX-105, SSX-108, (manufactured by Sekisui Kasei Co., Ltd.), MR-1HG, MR-2G, MR-5C, MX-300, MX-150, MX-500, MZ-5HN (manufactured by Soken Chemical and Engineering Co., Ltd.), and the like. Commercially available products of polystyrene particles and styrene/olefin copolymer particles are not particularly limited, and examples thereof include SBX-4, SBX-6, SBX-8 (manufactured by Sekisui Kasei Co., Ltd.), KSR-3A, SX-130H, SX-350H, and SX-500H (manufactured by Soken Chemical and Engineering Co., Ltd.), and the like.

An average particle size of the component (D) is not particularly limited, and is preferably 0.05 to 50 μm, more preferably 0.1 to 40 μm, and still more preferably 0.3 to 25 μm. Within the above range, it becomes possible to cope with screen printing even better. Here, the average particle size is a particle size (D50) at a cumulative volume ratio of 50% in a particle size distribution obtained by a laser diffraction/scattering method.

The shape of the component (D) is not particularly limited, and a spherical shape is preferable from the viewpoint of preventing clogging during screen printing.

The component (D) may be used alone or in combination of two or more.

The blending amount of the component (D) is not particularly limited, and is preferably 0.001 to 20 parts by mass, more preferably 0.005 to 10 parts by mass, and still more preferably 0.01 to 5 parts by mass, with respect to 100 parts by mass of the component (A). Within the above range, it is possible to provide a photocurable resin composition that can cope with application by screen printing even better and can be photocured in a short time.

<Optional Component>

The photocurable resin composition according to one embodiment of the present invention may use, as long as the object of the present invention is not impaired, an additive such as an oligomer or polymer having a (meth)acryloyl group (excluding the above component (A)), an inorganic fillers, an organic peroxides, a curing accelerators, a storage stabilizers, an antioxidants, a light stabilizers, a plasticizers, a pigments, a flame retardants, a surfactants, and the like.

The oligomer or polymer having a (meth)acryloyl group (excluding the above component (A)) is not particularly limited, and examples thereof include urethane (meth)acrylate with polybutadiene skeleton, urethane (meth)acrylate with hydrogenated polybutadiene skeleton, urethane (meth)acrylate with polycarbonate skeleton, urethane (meth)acrylate with polyether skeleton, urethane (meth)acrylate with polyester skeleton, urethane (meth)acrylate with castor oil skeleton, isoprene-based (meth)acrylate, hydrogenated isoprene-based (meth)acrylate, epoxy (meth)acrylate, (meth) acrylic group-containing acrylic polymer, and the like. Among these, from the viewpoint of having excellent compatibility with the above component (A) and the above component (B), urethane (meth)acrylate with polybutadiene skeleton, urethane (meth)acrylate with hydrogenated polybutadiene skeleton, urethane (meth)acrylate with castor oil skeleton, isoprene-based (meth)acrylate, and hydrogenated isoprene-based (meth)acrylate are preferable.

In the present specification, the oligomer is not theoretically restricted but can be defined as, for example, a compound having a structure in which repeating units of a monomer in the molecule are contained, such as a main chain, and containing 2 or more and less than 100 of the repeating units.

The oligomer or polymer having a (meth)acryloyl group (excluding the above component (A)) may be used alone or in combination of two or more.

An inorganic filler may be added to the photocurable resin composition according to one embodiment of the present invention for the purpose of improving the elastic modulus of a cured product, the flowability and the like, as long as the storage stability is not impaired. Specific examples thereof include inorganic powder, metallic powder, and the like. A filler of the inorganic powder is not particularly limited, and examples thereof include glass, fumed silica, alumina, mica, ceramics, silicone rubber powder, calcium carbonate, aluminum nitride, carbon powder, kaolin clay, dried clay mineral, dried diatomite, and the like. A blending amount of the inorganic powder is not particularly limited, and is preferably about 0.1 to 100 parts by mass with respect to 100 parts by mass of the component (A).

The fumed silica can be blended for the purpose of adjusting the viscosity of the photocurable resin composition or improving the mechanical strength of a cured product. A preferably usable fumed silica is, for example, one obtained by hydrophobic treatment with an organochlorosilane, a polyorganosiloxane, a hexamethyldisilazane, or the like. Specific examples of the fumed silica include commercially available products manufactured by NIPPON AEROSIL CO., LTD. under the trade names of AEROSIL (registered trademark) R974, R972, R972V, R972CF, R805, R812, R812S, R816, R8200, RY200, RX200, RY200S, R202, and the like.

An organic peroxide may be added to the photocurable resin composition according to one embodiment of the present invention for the purpose of imparting curability by heating or a redox reaction. When the redox reaction is used, radical species can be generated at room temperature, therefore, this is preferred. The organic peroxide is not particularly limited, and examples thereof include ketone peroxides such as methyl ethyl ketone peroxide, cyclohexanone peroxide, 3,3,5-trimethylcyclohexanone peroxide, methylcyclohexanone peroxide, methyl acetoacetate peroxide, and acetylacetone peroxide; peroxy ketals such as 1,1-bis (t-butylperoxy)-3,3,5-trimethylcyclohexane, 1,1-bis(t-butylperoxy)cyclohexane, 2,2-bis(t-butylperoxy) octane, n-butyl-4,4-bis(t-butylperoxy)valerate, and 2,2-bis(t-butylperoxy)butane; hydroperoxides such as t-butyl hydroperoxide, cumene hydroperoxide, diisopropylbenzene hydroperoxide, p-menthane hydroperoxide, 2,5-dimethylhexane-2,5-dihydroperoxide, and 1,1,3,3-tetramethylbutyl hydroperoxide; dialkyl peroxides such as di-t-butyl peroxide, t-butylcumyl peroxide, dicumyl peroxide, α, α'-bis(t-butylperoxy-m-isopropyl)benzene, 2,5-dimethyl-2,5-di(t-butylperoxy)hexane, and 2,5-dimethyl-2,5-di(t-butylperoxy)hexyne-3; diacyl peroxides such as acetyl peroxide, isobutyryl peroxide, octanoyl peroxide, decanoyl peroxide, lauroyl peroxide, 3,5,5-trimethylhexanoyl peroxide, succinic acid peroxide, benzoyl peroxide, 2,4-dichlorobenzoyl peroxide, and m-toluoyl peroxide; peroxydicarbonates such as diisopropyl peroxydicarbonate, di-2-ethylhexyl peroxydicarbonate, di-n-propyl peroxydicarbonate, bis-(4-t-butyl cyclohexyl)peroxydicarbonate, dimyristyl peroxydicarbonate, di-2-ethoxyethyl peroxydicarbonate, dimethoxyisopropyl peroxydicarbonate, di(3-methyl-3-methoxybutyl)peroxydicarbonate, and diallyl peroxydicarbonate; peroxy esters such as t-butyl peroxyacetate, t-butyl peroxyisobutyrate, t-butyl peroxypivalate, t-butyl peroxyneodecanoate, cumyl peroxyneodecanoate, t-butyl peroxy-2-ethylhexanoate, t-butyl peroxy-3,5,5-trimethylhexanoate, t-butyl peroxylaurate, t-butyl peroxybenzoate, di-t-butyl peroxyisophthalate, 2,5-dimethyl-2,5-di (benzoylperoxy)hexane, t-butyl peroxymaleic acid, t-butyl peroxyisopropyl carbonate, cumyl peroxyoctoate, t-hexyl peroxyneodecanoate, t-hexyl peroxypivalate, t-butyl peroxyneohexanoate, t-hexyl peroxyneohexanoate, and cumyl peroxyneohexanoate; acetylcyclohexylsulfonyl peroxide; t-butyl peroxyallylcarbonate; and the like. These organic peroxides may be used alone or in combination of multiple kinds thereof. Among these, cumene hydroperoxide is preferably used from the viewpoint of curability.

When an organic peroxide is used, a curing accelerator can be mixed for the purpose of promoting the redox reaction. As the curing accelerator, it is not particularly limited, and preferably, saccharin (o-benzoic acid sulfimide), a hydrazine compound, an amine compound, a mercaptan compound, a transition metal-containing compound, or the like is used.

The hydrazine compound is not particularly limited, and examples thereof include 1-acetyl-2-phenylhydrazine, 1-acetyl-2(p-tolyl)hydrazine, 1-benzoyl-2-phenylhydrazine, 1-(1',1',1'-trifluoro)acetyl-2-phenylhydrazine, 1,5-diphenylcarbohydrazine, 1-formyl-2-phenylhydrazine, 1-acetyl-2-(p-bromophenyl)hydrazine, 1-acetyl-2-(p-nitrophenyl)hydrazine, 1-acetyl-2-(2'-phenylethylhydrazine), ethyl carbazate, p-nitrophenylhydrazine, p-trisulfonylhydrazide, and the like.

The amine compound is not particularly limited, and examples thereof include heterocyclic secondary amine such as 2-ethylhexylamine, 1,2,3,4-tetrahydroquinone, and 1,2,3,4-tetrahydroquinaldine; heterocyclic tertiary amine such as quinoline, methylquinoline, quinaldine, and quinoxalinephenazine; aromatic tertiary amine such as N,N-dimethyl-p-toluidine, N,N-dimethyl-anisidine, and N,N-dimethylaniline; an azole-based compound such as 1,2,4-triazole, oxazole, oxadiazol, thiadiazole, benzotriazole, hydroxybenzotriazole, benzoxasole, 1,2,3-benzothiadiazole, and 3-mercaptobenzotrizole; and the like.

The mercaptan compound is not particularly limited, and examples thereof include n-dodecyl mercaptan, ethyl mercaptan, butyl mercaptan, tris-[(3-mercaptopropionyloxy)-ethyl]-isocyanurate, pentaerythritol tetrakis (3-mercaptopropionate), dipentaerythritol hexakis (3-mercaptopropionate), trimethylolpropane tris(3-mercaptopropionate), trimethylolpropane tris thioglycolate, pentaerythritol tetrakis thioglycolate, and the like.

The transition metal-containing compound is not particularly limited, and preferably a metal chelate complex salt is used. For example, pentadione iron, pentadione cobalt, pentadione copper, propylenediamine copper, ethylenediamine copper, iron naphthenate, nickel naphthenate, cobalt naphthenate, copper naphthenate, copper octoate, iron hexoate, iron propionate, acetylacetone vanadium, and the like can be mentioned.

The curing accelerator may be used alone or in combination of multiple kinds thereof. Among these, a mixture of saccharin, a hydrazine-based compound, an amine-based compound, and a transition metal-containing compound is more preferred because of having a favorable curing promotion effect.

A storage stabilizer may be added to the photocurable resin composition according to one embodiment of the present invention. The storage stabilizer is not particularly limited, and, for example, a radical absorbing agent such as benzoquinone, hydroquinone, or hydroquinone monomethyl ether, a metal chelating agent such as ethylene diamine tetraacetic acid or disodium salt thereof, oxalic acid, acetylacetone, or o-aminophenol, or the like may be added.

An antioxidant may be added to the photocurable resin composition according to one embodiment of the present invention. The antioxidant is not particularly limited, and examples thereof include quinone-based compounds such as β-naphthoquinone, 2-methoxy-1,4-naphthoquinone, methyl hydroquinone, hydroquinone, hydroquinone monomethyl ether, mono-tert-butyl hydroquinone, 2,5-di-tert-butylhydroquinone, p-benzoquinone, 2,5-diphenyl-p-benzoquinone, and 2,5-di-tert-butyl-p-benzoquinone; phenols (phenol-based compounds) such as phenothiazine, 2,2-methylene-bis(4-methyl-6-tert-butylphenol), catechol, tert-butyl catechol, 2-butyl-4-hydroxyanisol, 2,6-di-tert-butyl-p-cresol, 2-tert-butyl-6-(3-tert-butyl-2-hydroxy-5-methylbenzyl)-4-methylphenyl acrylate, 2-[1-(2-hydroxy-3,5-di-tert-pentylphenyl)ethyl]-4,6-di-tert-pentylphenyl acrylate, 4,4'-butylidene bis(6-tert-butyl-3-methylphenol), 4,4'-thiobis(6-tert-butyl-3-methylphenol), 3,9-bis[2-[3-(3-tert-butyl-4-hydroxy-5-methylphenyl)propionyloxy]-1,1-dimethylethyl]-2,4,8,10-tetraoxaspiro[5,5]undecane, pentaerythritol tetrakis[3-(3,5-di-tert-butyl-4-hydroxyphenyl)propionate], thiodiethylene bis[3-(3,5-di-tert-butyl-4-hydroxyphenyl)propionate], octadecyl-3-(3,5-di-tert-butyl-4-hydroxyphenyl)propionate, N,N'-hexane-1,6-diyl bis[3-(3,5-di-tert-butyl-4-hydroxyphenyl)propionamide], benzene propanoic acid, 3,5-bis(1,1-dimethylethyl)-4-hydroxy-C7-C9 side chain alkyl ester, 2,4-dimethyl-6-(1-methylpentadecyl)phenol, diethyl [[3,5-bis (1,1-dimethylethyl)-4-hydroxyphenyl]methyl]phosphonate, 3,3',3'',5,5',5''-hexa-tert-butyl-a,a',a''-(mesitylene-2,4,6-tolyl)tri-p-cresol, calcium diethylbis[[3,5-bis(1,1-dimethylethyl)-4-hydroxyphenyl]methyl]phosohonate, 4, 6-bis(octylthiomethyl)-o-cresol, ethylene bis(ozyethylene)bis [3-(5-tert-butyl-4-hydroxy-m-tolyl)propionate], hexamethylene bis[3-(3,5-di-tert-butyl-4 hydroxyphenyl)propionate, 1,3,5-tris(3,5-di-tert-butyl-4-hydroxybenzyl)-1,3,5-triazine-2,4,6(1H,3H,5H)-trione, 1,3,5-tris[(4-tert-butyl-3-hydroxy-2,6-xylyl)methyl]-1,3,5-triazine-2,4,6(1H,3H,5H)-trione, a reaction product between N-phenylbenzene amine and 2,4,6-trimethylpentene, 2,6-di-tert-butyl-4-(4,6-bis(octylthio)1,3,5-triazine-2-ylamino) phenol, and picric acid; phosphorous-based compounds such as tris(2,4-di-tert-butylphenyl)phosphite, tris[2[[2,4,8,10-tetra-tert-butyl dibenzo[d,f][1,3,2]dioxaphosphepin-6-yl]oxy]ethyl]amine, bis(2,4-di-tert-butylpheny)pentaerythritol diphosphite bis[2,4-bis(1,1-dimethylethyl)-6-methylphenyl] ethyl ester phosphorus acid, tetrakis(2,4-di-tert-butylphenyl) [1,1-bispheny]-4,4'-diyl bisphosphonite, and 6-[3-(3-tert-butyl-4-hydroxy-5-methylphenyl)propoxy]-2,4,8,10-tetra-tert-butyl dibenz[d,f][1,3,2]dioxaphosphepine; sulfur-based compounds such as dilauryl 3,3'-thiodipropionate, dimyristyl 3,3'-thiodipropionate, distearyl 3,3'-thiodipropionate, pentaerythrityl tetrakis(3-laurylthiopropionate), and 2-mercaptobenzimidazole; amine-based compounds such as phenothiazine; lactone-based compounds; vitamin E-based compounds; and the like. Among these, the phenol-based compound is preferable.

A light stabilizer may be added to the photocurable resin composition according to one embodiment of the present invention. The light stabilizer is not particularly limited, and examples thereof include a hindered amine-based compound such as bis(2,2,6,6-tetramethyl-4-piperidyl) sebacate, bis(1, 2,2,6,6-pentamethyl-4-piperidyl) sebacate, 4-benzoyloxy-2, 2,6,6-tetramethylpiperidine, 1-[2-[3-(3,5-di-tert-butyl-4-hydroxyphenyl)propionyloxy]ethyl]-4-[3-(3,5-di-tert-butyl-4-hydroxyphenyl)propionyloxy]-2,2,6,6-tetramethylpiperidine, 1,2,2,6,6-pentamethyl-4-piperidinyl-(meth)acrylate, bis(1,2,2,6,6-pentamethyl-4-piperidinyl)[[3, 5-bis(1,1-dimethylethyl)-4-hydroxyphenyl]methyl] butylmalonate, decanedioic acid bis(2,2,6,6-tetramethyl-1 (octyloxy)-4-piperidinyl) ester, a reaction product of 1,1-dimethylethyl hydroperoxide and octane, N,N',N'',N'''-tetrakis-(4,6-bis-(butyl-(N-methyl-2,2,6,6-tetramethylpiperidin-4-yl)amino)-triazine-2-yl)-4,7-diazadecane-1,10-diamine, a polycondensate of dibutylamine-1,3,5-triazine-N,N'-bis(2,2,6,6-tetramethyl-4-piperidyl-1,6-hexamethylenediamine and N-(2,2,6,6-tetramethyl-4-piperidyl)butylamine, poly[[6-(1,1,3,3-tetramethylbutyl)amino-1,3,5-triazine-2,4-diyl][(2,2,6,6-tetramethyl-4-piperidyflimino]hexamethylene[(2,2,6,6-tetramethyl-4-piperidyl)imino]], a polymer of dimethyl succinate and 4-hydroxy-2,2,6,6-tetramethyl-1-piperidineethanol, 2,2,4,4-tetramethyl-20-(β-lauryloxycarbonyl)ethyl-7-oxa-3,20-diazadispiro[5·1·11·2]heneicosane-21-one, β-alanine-N,-(2,2, 6,6-tetramethyl-4-piperidinyl)-dodecyl ester/tetradecyl ester, N-acetyl-3-dodecyl-1-(2,2,6,6-tetramethyl-4-piperidinyl)pyrrolidine-2,5-dione, 2,2,4,4-tetramethyl-7-oxa-3,20-diazadispiro[5,1,11,2]heneicosane-21-one, 2,2,4,4-tetramethyl-21-oxa-3,20-diazadicyclo-[5,1,11,2]-heneicosane-20-propanoic acid dodecyl ester/tetradecyl ester, propanedioic acid-[(4-methoxyphenyl)-methylene]-bis(1,2,2,6,6-pentamethyl-4-piperidinyl) ester, a higher fatty acid ester of 2,2,6, 6-tetramethyl-4-piperidinol, 1,3-benzenedicarboxamide-N, N'-bis(2,2,6,6-tetramethyl-4-piperidinyl); a benzophenone-based compound such as octabenzone; a benzotriazole-based compound such as 2-(2H-benzotriazol-2-yl)-4-(1,1,3, 3-tetramethyl-butyl)phenol, 2-(2-hydroxy-5-methylphenyl) benzotriazole, 2-[2-hydroxy-3-(3,4,5,6-tetrahydrophthalimide-methyl)-5-methyl-phenyl] benzotriazole, 2-(3-tert-butyl-2-hydroxy-5-methylphenyl)-5-chlorobenzotriazole, 2-(2-hydroxy-3,5-di-tert-pentylphenyl)benzotriazole, a reaction product of methyl 3-(3-(2H-benzotriazol-2-yl)-5-tert-butyl-4-hydroxyphenyl) propionate and polyethylene glycol, 2-(2H-benzotriazol-2-yl)-6-dodecyl-4-methylphenol; a benzoate-based compound such as 2,4-di-tert-butylphenyl-3,5-di-tert-butyl-4-hydroxybenzoate; a triazine-based compound such as 2-(4,6-diphenyl-1,3,5-triazin-2-yl)-5-[(hexyl)oxy]phenol; and the like. Among these, a hindered amine-based compound is particularly preferable.

An adhesion-imparting agent may be added to the photocurable resin composition according to one embodiment of the present invention. The adhesion-imparting agent is not particularly limited, and examples thereof include 3-methacryloxypropylmethyldimethoxysilane, 3-methacryloxypropyltrimethoxysilane, 3-methacryloxypropylmethyldiethoxysilane, 3-methacryloxypropyltriethoxysilane, 3-acryloxypropyltrimethoxysilane, methacryloxyoctyltrimethoxysilane, vinyltrimethoxysilane, vinyltrichlorosilane, vinyltriethoxysilane, vinyl-tris((3-methoxyethoxy)silane, γ-chloropropyltrimethoxysilane, β-(3,4-epoxycyclohexyl)ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, N-β-(aminoethyl)-γ-aminopropylmethyldimethoxysilane, γ-ureidopropyltriethoxysilane, hydroxyethyl methacrylate phosphate ester, methacryloxyoxyethyl acid phosphate, a half salt of methacryloxyoxyethyl acid phosphate monoethylamine, 2-hydroxyethyl methacrylic acid phosphate, and the like. Among these, a hydroxyethyl methacrylate phosphate ester, a methacryloxyoxyethyl acid phosphate, a half salt of methacryloxyoxyethyl acid phosphate monoethylamine, a 2-hydroxyethyl methacrylic acid phosphate, and the like are preferable. The content of the adhesion-imparting agent is not particularly limited, and is preferably 0.05 to 30 parts by mass, and more preferably 0.2 to 10 parts by mass with respect to 100 parts by mass of the component (A).

A method of producing the photocurable resin composition according to one embodiment of the present invention is not particularly limited, and the photocurable resin composition can be produced by a conventionally known method. The photocurable resin composition can be produced by, for example, blending predetermined amounts of the components (A) to (D), followed by mixing at a temperature of preferably 10 to 70° C. for preferably 0.1 to 5 hours using a mixing means such as a mixer. The photocurable resin composition according to one embodiment of the present invention is preferably produced in a light-shielding environment.

<Application Method>

A method for applying the photocurable resin composition according to one embodiment of the present invention to an adherend is not particularly limited. For example, it is possible to use methods such as dispensing using an automatic coater, spraying, inkjet, screen printing, gravure printing, dipping, and spin coating. Among these methods, the photocurable resin composition according to one embodiment of the present invention is most suitable for screen printing because the composition exerts the effect of defoaming air bubbles generated during screen printing. The photocurable resin composition according to one embodiment of the present invention is preferably liquid at 25° C. from the viewpoint of coatability.

<Curing Method>

A light source for curing the photocurable resin composition according to one embodiment of the present invention by irradiation with active energy rays (for example, light such as ultraviolet rays and visible light) is not particularly limited, and known light sources can be used. For example, a low pressure mercury lamp, a medium pressure mercury lamp, a high pressure mercury lamp, an extra high pressure mercury lamp, a black light lamp, a microwave excited mercury lamp, a metal halide lamp, a sodium lamp, a halogen lamp, a xenon lamp, an LED, a fluorescent lamp, sunlight, an electron beam irradiation device, and the like can be mentioned. An irradiation dose of light irradiation is preferably 3 kJ/m$^2$ or more and more preferably 5 kJ/m$^2$ or more from the viewpoint of the properties of a cured product. Furthermore, from the viewpoint of a tact time of a curing step, the irradiation dose is preferably 50 kJ/m$^2$ or less, more preferably 25 kJ/m$^2$ or less, and still more preferably 15 kJ/m$^2$ or less.

<Cured Product>

Another aspect of the present invention relates to a cured product of the photocurable resin composition described above or a curable sealing agent for a fuel cell according to another embodiment of the present invention, which will be described later. A cured product according to one embodiment of the present invention may be any product obtained by curing the photocurable resin composition described above or the curable sealing agent for a fuel cell according to another embodiment of the present invention described later regardless of a curing method employed. Here, the cured product according to one embodiment of the present invention is preferably obtained by curing the photocurable resin composition described above or the curable sealing agent for a fuel cell according to another embodiment of the present invention described later by irradiation with active energy rays such as ultraviolet rays in the foregoing curing method. Thus, the embodiment is preferably a cured product obtained by irradiating the photocurable resin composition described above or the curable sealing agent for a fuel cell according to another embodiment of the present invention described later with light.

<Usage and Sealing Agent>

As the application to suitably use the photocurable resin composition according to one embodiment of the present invention or a cured product thereof, a curable sealing agent can be mentioned. In the present specification, the sealing agent includes usages such as an adhesive, a coating agent, an injecting agent, a potting agent, and the like. For use in such usages, the photocurable resin composition described above is preferably liquid at 25° C.

Since the photocurable resin composition described above or the cured product thereof is a rubber elastic body being excellent in low gas permeability (particularly low hydrogen permeability), low moisture permeability, heat resistance, acid resistance, and flexibility, specific usages of the sealing agent include a stacked body such as a fuel cell, a solar cell, a dye-sensitized solar cell, a lithium ion battery, an electrolytic capacitor, a liquid crystal display, an organic EL display, an electronic paper, a LED, a hard disk device, a photodiode, optical communication/circuit, an electric wire/cable/optical fiber, an optical isolator, a IC card, and the like; a sensor; a substrate; a pharmaceutical and medical instrument and equipment; and the like. Among these usages, the usage as fuel cells, especially the usage as solid polymer fuel cells is particularly preferable because the photocurable resin composition described above can be quickly cured by irradiation with active energy rays such as ultraviolet rays and has excellent gas barrier properties. Thus, another aspect of the present invention relates to a curable sealing agent for a fuel cell, which includes the photocurable resin composition described above. As a preferred embodiment in this embodiment, a curable sealing agent for a solid polymer fuel cell containing the photocurable resin composition described above can be mentioned.

The curable sealing agent for a fuel cell according to one embodiment of the present invention is preferably a sealing agent for a periphery of any member selected from the group consisting of separators, frames, electrolyte membranes, fuel electrodes, air electrodes, and electrolyte membrane electrode assemblies, which are members in a fuel cell. That is, in the curable sealing agent for a fuel cell according to one embodiment of the present invention, a cured product thereof is preferably used to seal a periphery of these members. The curable sealing agent for a fuel cell according to one embodiment of the present invention is more preferably a sealing agent between adjacent separators in a fuel cell or a sealing agent between a frame and an electrolyte membrane or an electrolyte membrane electrode assembly (MEA) in a fuel cell. That is, in the curable sealing agent for a fuel cell according to one embodiment of the present invention, a cured product thereof is more preferably used to seal between adjacent separators in a fuel cell according to one embodiment of the present invention, used to seal between a frame and an electrolyte membrane (MEA) in a fuel cell, or used to seal between a frame and an electrolyte membrane electrode assembly (MEA) in a fuel cell.

A fuel cell (preferably solid polymer fuel cell) to which the curable sealing agent for a fuel cell according to one embodiment of the present invention is applied is not particularly limited.

<Fuel Cell>

The curable sealing agent for a fuel cell according to one embodiment of the present invention is applied to a fuel cell as described above. Another aspect of the present invention relates to a fuel cell.

A fuel cell is a power generator that generates electricity by chemically reacting hydrogen and oxygen. As for fuel cells, there are four main types including a solid polymer fuel cell, a phosphoric acid fuel cell, a molten carbonate fuel cell, and a solid oxide fuel cell. Among these, the solid polymer fuel cell achieves high power generation efficiency while having a relatively low operating temperature (around 80° C.), and therefore is preferably used for applications such as power sources for automobiles, power generators for households, small power source for electronic equipment such as a mobile phone, and power sources for emergency.

Hereinafter, an example of the fuel cell will be described with reference to the accompanying drawings. However, the fuel cell to which the curable sealing agent for a fuel cell according to one embodiment of the present invention is applied, and the fuel cell according to another embodiment of the present invention are not limited to those shown below. In the description of the drawings, the same elements are denoted by the same reference numerals, and duplicate descriptions will be omitted. The dimensional ratios in the drawings may be exaggerated and different from the actual ratios for the convenience of description.

FIG. 1 is a schematic cross-sectional view of a single cell of an example of a fuel cell. FIG. 2 is a schematic diagram illustrating the entirety of an example of the fuel cell. As shown in FIG. 1, a typical cell 1 of a solid polymer fuel cell has a structure including: an electrolyte membrane electrode assembly 5 (MEA) structured such that a polymer electrolyte membrane 4 is nipped between an air electrode (cathode electrode) 3a and a fuel electrode (anode electrode) 3b, a frame 6 that supports the MEA, and a separator 2 by which a gas flow path is formed. When the solid polymer fuel cell is activated, a fuel gas (hydrogen gas) and an oxidation gas (oxygen gas) are supplied through an oxidation gas flow path 8a and a fuel gas flow path 8b. Moreover, for the purpose of suppressing heat generation during power generation, cooling water flows through a flow path 9. A package including several hundreds of such cells stacked on one another is referred to as a cell stack 10 as illustrated in FIG. 2. The solid polymer fuel cell 11 has the cell stack 10.

When the fuel gas (hydrogen gas) is supplied to the fuel electrode (anode electrode) and the oxidation gas (oxygen gas) is supplied to the oxygen electrode (air electrode, cathode electrode), the following reactions occur at the respective electrodes, and a reaction to generate water ($H_2 + \frac{1}{2}O_2 \rightarrow H_2O$) occurs as a whole. To be more specific, protons ($H^+$) generated at the fuel electrode as described below are diffused inside the solid polymer membrane to move to the oxygen electrode side, and water ($H_2O$) generated by reaction with the oxygen is discharged from the oxygen electrode side.

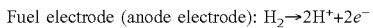

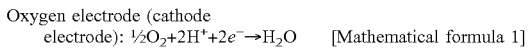

In order to activate the solid polymer fuel cell, it is necessary to supply a fuel gas containing hydrogen to the anode electrode and supply an oxidation gas containing oxygen to the cathode electrode in such a separated manner that these gases can be isolated from each other. This is because there is a risk of lowering the power generation efficiency if one of the gases is mixed with the other gas due to insufficiency of the isolation. Against such a background, a sealing agent is used in many portions for the purpose of preventing leakage of the fuel gas, the oxygen gas, and so on. Specifically, the sealing agent is used between adjacent separators, between a separator and a frame, between a frame and an electrolyte membrane or MEA, and so on. This corresponds to a case where at least one of an adhesive or sealing material 7 in FIG. 1 is a sealing material. From this, the fuel cell according to one embodiment of the present invention includes at least one seal selected from the group consisting of a seal between adjacent separators in the fuel cell and a seal between a frame and an electrolyte membrane or an electrolyte membrane electrode assembly in the fuel cell, and at least one of the seals is preferably the cured product of the photocurable resin composition or the cured product of the curable sealing agent for a fuel cell described above. The fuel cell is more preferably a solid polymer fuel cell.

As the polymer electrolyte membrane described above, for example, there is a cation exchange membrane having ion conductivity, and a preferable one is made of a fluorine-based polymer having a sulfonic acid group or the like, because it is chemically stable and has high resistance under high-temperature operation. Examples of commercially available products include Nafion (registered trademark) manufactured by DuPont, Flemion (registered trademark) manufactured by Asahi Glass Co., Ltd., Aciplex (registered trademark) manufactured by Asahi Kasei Corporation, and the like. Although a polymer electrolyte membrane generally has properties difficult to bond, use of the photocurable resin composition or the curable sealing agent for a fuel cell described above makes it possible to bond the polymer electrolyte membrane.

[Chemical 3]

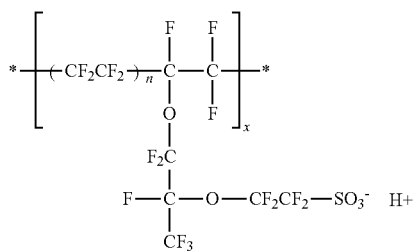

Nafion (registered trademark)

The fuel electrode is called a hydrogen electrode or an anode, and a known electrode is used as the fuel electrode. For example, an electrode in which carbon carries a catalyst such as platinum, nickel, or ruthenium is used. Meanwhile, the air electrode is called an oxygen electrode or a cathode, and a known electrode is used as the air electrode. For example, an electrode in which carbon carries a catalyst such as platinum or an alloy is used. The surface of each electrode may be provided with a gas diffusion layer which functions to diffuse the gas or to moisturize the electrolyte. As the gas diffusion layer, a known layer is used. For example, carbon paper, carbon cloth, carbon fiber and the like can be mentioned.

As illustrated in FIG. 1, the above separator 2 is provided with a finely-ribbed flow path, through which a fuel gas or an oxidizing gas is supplied to the electrode. The separator is made of aluminum, stainless steel, titanium, graphite, carbon, or the like.

The frame supports and reinforces an electrolyte membrane or MEA, which is a thin membrane, so as not to break the electrolyte membrane or MEA. As a material for the frame, there are thermoplastic resins such as polyvinyl chloride, polyethylene naphthalate, polyethylene terephthalate, polypropylene, and polycarbonate. In addition, in order to bond members using the above photocurable resin composition, the curable sealing agent for a fuel cell, or a cured product thereof, it is preferable that the members be light-transmissive.

The fuel cell according to one embodiment of the present invention is a fuel cell characterized in that sealing is provided by the above photocurable resin composition, the curable sealing agent for a fuel cell, or a cured product thereof. As the members needed to be sealed in the fuel cell, for example, there are the separators, the frame, the electrolyte membrane, the fuel electrode, the air electrode, the MEA, and so on. More specifically, sealing is provided between the adjacent separators, between the separator and the frame, between the frame and the electrolyte membrane or MEA (between the frame and the electrolyte membrane or between the frame and MEA), and the like. The main purpose of sealing "between the separator and the frame" or "between the polymer electrolyte membrane or the MEA and the frame" is to prevent mixing or leakage of the gases, and the sealing between the adjacent separators is provided in order to prevent leakage of the gas and to prevent leakage of the cooling water to the outside from the cooling water flow path. Since a strongly acidic atmosphere is formed by the acid generated from the electrolyte membrane, a preferable sealing agent is required to have acid resistance.

<Sealing Method>

Another aspect of the present invention relates to a sealing method using the photocurable resin composition (or the curable sealing agent for a fuel cell described above) described above.

A sealing method using the photocurable resin composition described above is not particularly limited, and typical methods are FIPG (Form-in-Place Gasket), CIPG (Cure-in-Place Gasket), MIPG (Mold-in-Place Gasket), liquid injection molding, and the like.

FIPG is an adhesive sealing method involving: applying the photocurable resin composition described above to a flange of a seal target component by an automatic coater or the like; and curing the photocurable resin composition, with the flange stuck on another flange, by irradiation with active energy rays such as ultraviolet rays from the light-transmissive flange side. More specifically, FIPG is a method for sealing at least part between at least two flanges of a seal target component having at least two flanges, and at least one of the flanges is light-transmissive for active energy rays, and the method includes a step of applying the photocurable resin composition described above to a surface of at least one of the flanges, a step of sticking the one flange with the photocurable resin composition applied thereto onto the other flange with the photocurable resin composition interposed in between, and a step of sealing the at least part between the at least two flanges by curing the photocurable resin composition by irradiation with active energy rays through the light-transmissive flange. A preferred example is a method for sealing at least part between at least one pair of two flanges to be bonded in a seal target component having the at least two flanges. In this method, at least one of the two flanges to be bonded allows active energy rays to pass therethrough, and the method includes a step of applying the photocurable resin composition described above to a surface of one of the two flanges to be bonded, a step of sticking one of the two flanges to be bonded onto the other flange with the photocurable resin composition interposed in between, after applying the photocurable resin composition, and a step of curing the photocurable resin composition by irradiation with active energy rays through the flange of the two flanges to be bonded, wherein the flange allows the active energy rays to pass therethrough, and sealing the at least part of between the two flanges to be bonded.

CIPG is a method involving: applying the photocurable resin composition described above in the form of a bead to a flange of a seal target component by a screen printing coater, an automatic coater, or the like; forming a gasket by curing the photocurable resin composition by irradiation with active energy rays such as ultraviolet rays; and then performing compression sealing with the flange stuck on another flange. More specifically, CIPG is a method for sealing at least part between at least two flanges of a seal target component having the at least two flanges, and the method includes a step of applying the photocurable resin composition described above to at least one of the flanges, a step of irradiating the applied photocurable resin composition with active energy rays to cure the photocurable resin composition to form a gasket composed of a cured product of the photocurable resin composition, and a step of placing the other flange on the gasket, pressure bonding the one flange with the photocurable resin composition applied thereto and the other flange together with the gasket interposed in between, and sealing the at least part between the at least two flanges. A preferred example is a method for sealing at least part between at least one pair of two flanges to be bonded in a seal target component having the at least two flanges. This method includes a step of applying the photocurable resin composition described above to one of the two flanges to be bonded, a step of curing the photocurable resin composition by irradiating the photocurable resin composition after the applying step with active energy rays to form a gasket composed of a cured product of the photocurable resin composition, and a step of placing the other flange of the two flanges to be bonded on the gasket, pressure bonding the one flange in which the gasket of the two flanges to be bonded is placed and the other flange placed on the gasket together with the gasket interposed in between, and sealing the at least part between the two flanges to be bonded.

MIPG is a method involving: placing a mold in pressure contact with a flange of a seal target component in advance, injecting the photocurable resin composition described above into a cavity formed between the mold made of a light-transmissive material and the flange, forming a gasket by photocuring the photocurable resin composition by irradiation with the active energy rays such as ultraviolet rays, and performing compression sealing with the flange stuck on the other flange. Here, the mold is preferably made of a light-transmissive material, which is specifically glass, polymethylmethacrylate (PMMA), polycarbonate, cycloolefin polymer, olefin, or the like. In addition, for easy demolding of the gasket from the mold after the formation of the gasket, it is preferable to apply a release agent, such as a fluorine-based agent or a silicone-based agent, in advance. More specifically, MIPG is a method for sealing at least part between at least two flanges of a seal target component having the at least two flanges, and the method includes a step of placing a gasket formation mold on at least one of the flanges, a step of injecting the photocurable resin composition described above into at least part of a cavity between the gasket formation mold and the flange on which the mold is placed, a step of irradiating the photocurable resin composition with active energy rays to cure the photocurable resin composition, and thus to form a gasket composed of a cured product of the photocurable resin composition, a step of detaching the mold from the one flange, and a step of placing the other flange on the gasket, pressure bonding the one flange and the other flange together with the gasket interposed in between, and sealing the at least part between the at least two flanges. A preferred example is a method for sealing at least part between at least one pair of two flanges to be bonded in a seal target component having the at least two flanges. This method includes a step of placing a gasket formation mold on one of the two flanges to be bonded, a step of injecting the photocurable resin composition described above into at least part of a cavity between the gasket formation mold and the flange on which the gasket formation mold is placed, a step of curing the photocurable resin composition by irradiating the injected photocurable resin composition with active energy rays to form a gasket composed of a cured product of the photocurable resin composition, a step of detaching the gasket formation mold from the flange in which the gasket formation mold is placed, and a step of placing the other flange of the two flanges to be bonded on the gasket, pressure bonding the one flange in which the gasket of the two flanges to be bonded is placed and the other flange placed on the gasket together with the gasket interposed in between, and sealing the at least part between the two flanges to be bonded.

The liquid injection molding is a method involving: forming a gasket by injecting the photocurable resin composition described above with a predetermined pressure into a mold made of a light-transmissive material, and photocuring the photocurable resin composition by irradiation with active energy rays such as ultraviolet rays; and performing compression sealing with the flange stuck on the other flange. Here, the mold is preferably made of a light-transmissive material, which is specifically glass, PMMA, polycarbonate, cycloolefin polymer, olefin, or the like. In addition, for easy demolding of the gasket from the mold after the formation of the gasket, it is preferable to apply a release agent, such as a fluorine-based agent or a silicone-based agent, in advance.

EXAMPLE

Hereinafter, the present invention will be described in details by taking Examples, but the present invention should not be limited to these Examples.
<Production of a1>

Synthesis Example 1: Production of Polyisobutylene (a1) Having Acryloyloxyethoxy Phenyl Group After the inside of a 5 L separable flask was replaced with nitrogen, 200 mL of n-hexane and 2000 mL of butyl chloride were added, and then were cooled to −70° C. while being stirred under a nitrogen atmosphere. Subsequently, 840 mL (9 mol) of isobutylene, 12 g (0.05 mol) of p-dicumyl chloride, and 1.1 g (0.012 mol) of 2-methylpyridine were added. After the reaction mixture was cooled to −70° C., 5.0 mL (0.05 mol) of titanium tetrachloride was added to initiate polymerization. Three hours after the initiation of polymerization, 40 g of phenoxyethyl acrylate (LIGHT ACRYLATE PO-A, manufactured by kyoeisha Chemical Co., Ltd.) and 110 ml of titanium tetrachloride were added. After that, stirring was continued at −70° C. for 4 hours, and then 1000 ml of methanol was added to stop the reaction.

The supernatant was fractionated from the reaction solution, and the solvent and so on were distilled off. After that, the product was dissolved in 3000 ml of n-hexane, was washed with 3000 ml of pure water three times, and was reprecipitated from the methanol. Thereafter, the solvent was distilled off under reduced pressure, and the obtained polymer was vacuum-dried at 80° C. for 24 hours to obtain a polyisobutylene (a1) having an acryloyloxyethoxy phenyl group.

The polymer (a1) contains —[$CH_2C(CH_3)_2$]— unit, and has two acryloyl groups. More specifically, a1 is a polymer of the general formula (1) in which $R^1$ represents a phenylene group, PIB represents a polyisobutylene skeleton containing —[$CH_2C(CH_3)_2$]— unit, $R^4$ represents a hydrocarbon group (ethylene group) having 2 carbon atoms, $R^2$ and $R^3$ each independently represent a hydrogen atom, $R^5$ represents a hydrogen atom, and n is 2. The number average molecular weight (chromatography method, in terms of polystyrene) of the (a1) was 11,100, and the viscosity (25° C.) of the (a1) was 1,550 Pa·s.

<Preparation of Photocurable Resin Composition>

Example 1

100 parts by mass of the polyisobutylene (a1) having an acryloyloxyethoxy phenyl group obtained as the component (A) of the present invention in Synthesis Example 1 above, 3 parts by mass of 4-hydroxybutyl acrylate (4HBA, manufactured by Osaka Organic Chemical Industry Ltd.) as a component (b1-1) of the component (B), 50 parts by mass of isobornyl methacrylate (SR423, manufactured by Sartomer) as the component (b2) of the component (B), 2 parts by mass of bis(2,4,6-trimethylbenzoyl)-phenyl-phosphine oxide (Omnirad 819, manufactured by IGM Resins B.V.) as the component (C), and 0.05 parts by mass of acrylic resin particles (MR-2G, manufactured by Soken Chemical and Engineering Co., Ltd.) with an average particle size of 1 µm as the component (D) were added in a planetary mixer, and the mixture was mixed by the planetary mixer for 60 minutes at normal temperature (25° C.) under a light-shielded condition to obtain a photocurable resin composition of Example 1. The photocurable resin composition was liquid at 25° C.

Example 2

A photocurable resin composition of Example 2 was obtained in the same preparation method as in Example 1 except that the amount of 4-hydroxybutyl acrylate added as the component (b1-1) was 6 parts by mass in Example 1. The photocurable resin composition was liquid at 25° C.

Example 3

A photocurable resin composition of Example 3 was obtained in the same preparation method as in Example 1 except that hydroxypropyl acrylate (HPA, manufactured by Osaka Organic Chemical Industry Ltd.) as a component (b1-2) was used instead of 4-hydroxybutyl acrylate as the component (b1-1) in Example 1. The photocurable resin composition was liquid at 25° C.

Example 4

A photocurable resin composition of Example 4 was obtained in the same preparation method as in Example 1 except that hydroxyethyl acrylate (HEA, manufactured by Osaka Organic Chemical Industry Ltd.) as a component (b1-3) was used instead of 4-hydroxybutyl acrylate as the component (b1-1) in Example 1. The photocurable resin composition was liquid at 25° C.

Example 5

A photocurable resin composition of Example 5 was obtained in the same preparation method as in Example 1 except that styrene-olefin copolymer particles (SBX-6, manufactured by Sekisui Kasei Co., Ltd.) with an average particle size of 6 μm as the component (D) were used instead of the acrylic resin particles with an average particle size of 1 μm in Example 1. The photocurable resin composition was liquid at 25° C.

Comparative Example 1

A photocurable resin composition of Comparative Example 1 was obtained in the same preparation method as in Example 1 except that 4-hydroxybutyl acrylate as the component (b1-1) was removed in Example 1.

Comparative Example 2

A photocurable resin composition of Comparative Example 2 was obtained in the same preparation method as in Example 1 except that zirconia particles (manufactured by Tosoh Corporation) with an average particle size of 30 μm were used instead of the acrylic resin particles with an average particle size of 1 μm as the component (D) in Example 1.

Comparative Example 3

A photocurable resin composition of Comparative Example 3 was obtained in the same preparation method as in Example 1 except that the component (b2) was removed and the amount of 4-hydroxybutyl acrylate as the component (b1-1) was changed from 3 parts by mass to 53 parts by mass in Example 1. The photocurable resin composition of Comparative Example 3 was separated immediately after production. Thus, it was difficult to evaluate the properties.

Test methods used in Examples and Comparative Examples in Table 1 below are as follows.

(1) Screen Printing Property Confirmation Test

As for the confirmation test, an evaluation test was conducted at the following two levels.

Test A: Each photocurable resin composition was printed and coated on a polytetrafluoroethylene sheet by a screen printing machine in a 25° C. environment using a SUS mesh screen printing plate with an opening of about 110 μm. After 10 seconds, it was confirmed with the naked eye whether or not air bubbles disappeared from a printed layer (thickness 50 μm) of the photocurable resin composition.

Test B: Each photocurable resin composition was squeegee-coated onto a nylon 125-mesh still-stood on a glass plate. After printing and coating, the nylon mesh was manually peeled off from the glass plate, and after 10 seconds, it was confirmed with the naked eye whether or not air bubbles disappeared from a printed layer (thickness 50 μm) of the coated photocurable resin composition.

The above implementation results are summarized in Table 1 below. The evaluation criteria were as follows.

<Evaluation Criteria>

Accepted: No air bubbles were confirmed in both evaluation tests A and B,

Rejected: Air bubbles were confirmed in either test A or B.

(2) Photocurability Confirmation Test 0.01 g of each photocurable resin composition was dropped onto a slide glass and covered with a cover glass to prepare a test piece in which the photocurable resin composition was sandwiched between the glasses as a thin film. Next, using an ultraviolet irradiator (UniJet L60 manufactured by Ushio Inc.), an active energy ray was applied to an integrated light intensity of 875 mJ/cm$^2$ (illuminance 250 mW/cm$^2$×3.5 seconds), and then, a test was performed to confirm that the glasses adhered to each other so as to be immovable by hands.

<Evaluation Criteria>

Accepted: Curing was confirmed because the glasses were not be moved by hand,

Rejected: The glasses were moved by hand, and the composition was uncured.

TABLE 1

| | Evaluation result of screen printing property and photocurability of photocurable resin composition | | | | | | |
|---|---|---|---|---|---|---|---|
| | Example 1 | Example 2 | Example 3 | Example 4 | Example 5 | Comparative Example 1 | Comparative Example 2 |
| Screen printing property | Accepted | Accepted | Accepted | Accepted | Accepted | Rejected (air bubbles were confirmed in both tests A and B) | Rejected (air bubbles were confirmed in both tests A and B) |
| Photocurability | Accepted | Accepted | Accepted | Accepted | Accepted | Rejected | Accepted |

According to Examples 1 to 5 in Table 1, it can be seen that the present invention can provide a photocurable resin composition that can cope with application by screen printing and can be photocured in a short time of 3.5 seconds.

Although Comparative Example 1 in Table 1 was a photocurable resin composition in which the component (b1-1) of the component (B) of the present invention was not contained, the result was that both screen printability and photocuring in a short time were inferior. Although Comparative Example 2 was a composition using metal particles instead of the component (D) of the present invention, the result was that the screen printability was inferior.

In addition, moisture permeability (water vapor barrier property) and hydrogen gas barrier property were tested.

(3) Moisture Permeability (Water Vapor Barrier Property)

The photocurable resin composition of Example 1 was poured into a frame of 200 mm×200 mm×1.0 mm. Then, using an ultraviolet irradiator, an ultraviolet ray was applied for 20 seconds to an integrated light intensity of 45 kJ/m² to prepare a sheet-shaped cured product having a thickness of 1.0 mm. 5 g of (anhydrous) calcium chloride was placed in an aluminum cup having an opening with a diameter of 30 mm, and the cured product was set in the cup. After the "initial total weight" (g) was measured, the cup was left for 24 hours in a thermo-hygrostat kept at an atmosphere temperature of 40° C. and a relative humidity of 95%. Thereafter, the "total weight after leaving" (g) was measured, and the moisture permeability (g/m²·24 h) was calculated and evaluated based on the following evaluation criteria. The detailed test method conforms to JIS Z 0208: 1976. Table 2 below shows the results of this implementation. For use as a curable sealing agent for a fuel cell, the moisture permeability is preferably less than 10 g/m²·24 h.

[Evaluation Criteria]

Accepted: The moisture permeability is less than 10 g/m²·24 h,

Rejected: The moisture permeability is 10 g/m²·24 h or more.

(4) Hydrogen Gas Barrier Property Test

Using the photocurable resin composition of Example 1, an ultraviolet ray was applied for 20 seconds by an ultraviolet irradiator to an integrated light intensity of 45 kJ/m² to prepare a sheet-shaped cured product having a thickness of 1.0 mm. Next, using the sheet-shaped cured product, a transmission rate of hydrogen gas was measured in accordance with JIS K 7126-1: 2006 (Plastics-Film and sheeting-Determination of gas-transmission rate-Part 1: Differential-pressure method). The type of the test was a pressure sensor method, and the gas transmission rate was measured under the conditions at 23° C. and with a test gas (hydrogen gas) on the high pressure side set to 100 kPa, and then was evaluated based on the following evaluation criteria. Table 2 below shows the results of this implementation. For use as a photocurable sealing agent for a fuel cell, the hydrogen gas barrier property is preferably less than $1\times10^{-15}$ mol·m/m²·s·Pa.

[Evaluation Criteria]

Accepted: less than $1\times10^{-15}$ mol·m/m²·s·Pa,

Rejected: $1\times10^{-15}$ mol·m/m²·s·Pa or more.

TABLE 2

Evaluation result of moisture permeability and hydrogen gas barrier property of photocurable resin composition

| | Moisture permeability | Hydrogen gas barrier property |
| --- | --- | --- |
| Example 1 | Accepted | Accepted |

According to Example 1 of Table 2, it can be seen that the present invention has low moisture permeability, excellent hydrogen barrier property, and good sealing property.

In addition, a storage stability confirmation test and a crystallization confirmation test were conducted.

(5) Storage Stability Confirmation Test

Immediately after production, the photocurable resin composition of Example 1 and the photocurable resin composition of Comparative Example 2 were placed in glass bottles, respectively, and stored at 25° C. for 1 month in a light-shielding environment, and then, the presence or absence of phase separation was confirmed with the naked eye. The evaluation result of Example 1 was "accepted" because no separation was confirmed, and the evaluation result of Comparative Example 2 was "rejected" because separation was confirmed. It was confirmed that the phase separation could be suppressed by using organic resin particles instead of metal particles in the photocurable resin composition of the present invention.

(6) Crystallization Confirmation Test

Immediately after production, the photocurable resin composition of Example 1 and the photocurable resin composition of Comparative Example 1 were placed in glass bottles, respectively, and stored at 25° C. for 1 week in a light-shielding environment, and then, the presence or absence of crystal precipitation was confirmed with the naked eye. The evaluation result of Example 1 was "accepted" because it was "without crystal precipitation", and the evaluation result of Comparative Example 1 was "rejected" because it was "with crystal precipitation". It was confirmed that crystallization could be suppressed by combining the component (b1) and the component (b2) as the components (B) in the photocurable resin composition of the present invention.

INDUSTRIAL APPLICABILITY

The present invention has been made in view of the foregoing circumstances, and is a photocurable resin composition that can cope with application by screen printing and can be photocured in a short time, and therefore, the present invention can be used for various sealing applications. In particular, it is industrially useful because it is effective as a curable sealing agent for a fuel cell.

This application is based on Japanese Patent Application No. 2018-217819 filed on Nov. 21, 2018, and its disclosure is incorporated herein by reference in its entirety.

REFERENCE SIGNS LIST

1 Cell of solid polymer fuel cell
2 Separator
3a Air electrode (cathode)
3b Fuel electrode (anode)
4 Polymer electrolyte membrane
5 Electrolyte membrane electrode assembly (MEA)
6 Frame
7 Adhesive or sealing agent
8a Oxidation gas flow path 8b Fuel gas flow path
9 Cooling water flow path
10 Cell stack
11 Solid polymer fuel cell

The invention claimed is:
1. A photocurable resin composition comprising the following components (A) to (D):
component (A): a polymer having one or more (meth)acryloyl groups and a polyisobutylene skeleton containing —[CH$_2$C(CH$_3$)$_2$]— unit,
component (B): a monofunctional monomer containing the following component (b1) and component (b2),
component (b1): a monofunctional monomer having a (meth)acryloyl group and a hydroxy group,
component (b2): a monofunctional monomer having a (meth)acryloyl group and no hydroxy group,
component (C): a radical polymerization initiator, and
component (D): organic resin particles.
2. The photocurable resin composition according to claim 1, wherein the component (A) is a polymer having a polyisobutylene skeleton represented by the following general formula (1):

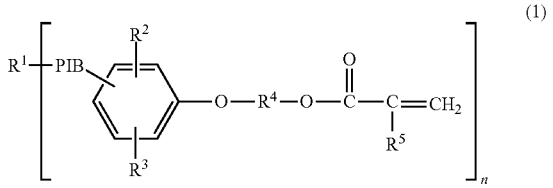

wherein R$^1$ represents a monovalent or polyvalent aromatic hydrocarbon group or a monovalent or polyvalent aliphatic hydrocarbon group,
PIB represents a polyisobutylene skeleton containing the —[CH$_2$C(CH$_3$)$_2$]— unit,
R$^4$ represents a divalent hydrocarbon group having 2 to 6 carbon atoms, which optionally contains an oxygen atom,
R$^2$ and R$^3$ each independently represent a hydrogen atom or a monovalent hydrocarbon group having 1 to 20 carbon atoms,
R$^5$ represents a hydrogen atom or a methyl group, and
n represents an integer of 1 to 6.
3. The photocurable resin composition according to claim 1, containing 0.1 to 15 parts by mass of the component (b1) and 5 to 500 parts by mass of the component (b2), with respect to 100 parts by mass of the component (A).
4. The photocurable resin composition according to claim 1, wherein an average particle size of the component (D) is 0.05 to 50 μm.
5. The photocurable resin composition according to claim 1, wherein the component (D) is at least one selected from the group consisting of (meth)acrylic resin particles, polystyrene particles, styrene/olefin copolymer particles, polyethylene particles, and polypropylene particles.
6. The photocurable resin composition according to claim 1, wherein the component (b1) is at least one selected from the group consisting of 4-hydroxybutyl (meth)acrylate, 3-hydroxypropyl (meth)acrylate, 2-hydroxypropyl (meth)acrylate, 2-hydroxyethyl (meth)acrylate, 2-hydroxybutyl (meta)acrylate, 2-hydroxy-3-phenoxypropyl acrylate, 2-acryloyloxyethyl-2-hydroxyethyl-phthalic acid, and 2-(meth)acryloyloxyethyl acid phosphate.

7. The photocurable resin composition according to claim 1, wherein the component (b2) is a (meth)acrylate monomer having an alkyl group having 5 to 30 carbon atoms or an alicyclic hydrocarbon group having 5 to 30 carbon atoms and having no hydroxy group.
8. A curable sealing agent for a fuel cell, comprising the photocurable resin composition according to claim 1.
9. The curable sealing agent for a fuel cell according to claim 8, which is a sealing agent for a periphery of any member selected from the group consisting of separators, frames, electrolyte membranes, fuel electrodes, air electrodes, and electrolyte membrane electrode assemblies, which are members in a fuel cell.
10. The curable sealing agent for a fuel cell according to claim 8, which is a sealing agent between adjacent separators in a fuel cell or a sealing agent between a frame and an electrolyte membrane or an electrolyte membrane electrode assembly in a fuel cell.
11. The curable sealing agent for a fuel cell according to claim 8, which is a sealing agent for a solid polymer fuel cell.
12. A cured product obtained by applying light to the photocurable resin composition according to claim 1.
13. A fuel cell comprising at least one seal selected from the group consisting of a seal between adjacent separators in the fuel cell and a seal between a frame and an electrolyte membrane or an electrolyte membrane electrode assembly in the fuel cell, wherein at least one of the seals is the cured product according to claim 12.
14. The fuel cell according to claim 13, which is a solid polymer fuel cell.
15. A method for sealing at least part between at least two flanges of a seal target component having the at least two flanges,
wherein at least one of the flanges is light-transmissive for active energy rays, and
the method comprises:
a step of applying the photocurable resin composition according to claim 1 to a surface of at least one of the flanges;
a step of sticking the one flange with the photocurable resin composition applied thereto onto the other flange with the photocurable resin composition interposed in between; and
a step of sealing the at least part between the at least two flanges by curing the photocurable resin composition by irradiation with the active energy ray through the light-transmissive flange.
16. A method for sealing at least part between at least two flanges of a seal target component having the at least two flanges, comprising:
a step of applying the photocurable resin composition according to claim 1 to at least one of the flanges;
a step of irradiating the applied photocurable resin composition with an active energy ray to cure the photocurable resin composition to form a gasket composed of a cured product of the photocurable resin composition; and
a step of placing the other flange on the gasket, pressure bonding the one flange with the photocurable resin composition applied thereto and the other flange together with the gasket interposed in between, and sealing the at least part between the at least two flanges.
17. A method for sealing at least part between at least two flanges of a seal target component having the at least two flanges, comprising:

a step of placing a gasket formation mold on at least one of the flanges;

a step of injecting the photocurable resin composition according to claim 1 into at least part of a cavity between the gasket formation mold and the flange on which the mold is placed;

a step of irradiating the photocurable resin composition with an active energy ray to cure the photocurable resin composition, and thus to form a gasket composed of a cured product of the photocurable resin composition;

a step of detaching the mold from the one flange; and a step of placing the other flange on the gasket, pressure bonding the one flange and the other flange together with the gasket interposed in between, and sealing the at least part between the at least two flanges.

* * * * *